United States Patent
Marriott et al.

(10) Patent No.: US 8,552,990 B2
(45) Date of Patent: *Oct. 8, 2013

(54) TOUCH PAD FOR HANDHELD DEVICE

(75) Inventors: Greg Marriott, Palo Alto, CA (US); Guy Bar-Nahum, San Francisco, CA (US); Steven Bollinger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1242 days.

This patent is subject to a terminal disclaimer.

(21) Appl. No.: 11/882,422

(22) Filed: Aug. 1, 2007

(65) Prior Publication Data
US 2008/0012837 A1    Jan. 17, 2008

Related U.S. Application Data

(63) Continuation of application No. 10/722,948, filed on Nov. 25, 2003, now Pat. No. 7,495,659.

(51) Int. Cl.
*G09G 5/00* (2006.01)

(52) U.S. Cl.
USPC ........................................ 345/173; 178/18.01

(58) Field of Classification Search
USPC ................... 345/173–179; 178/18.01–18.11
See application file for complete search history.

(56) References Cited

U.S. PATENT DOCUMENTS

| | | | |
|---|---|---|---|
| 1,061,578 A | 5/1913 | Wischhusen et al. | |
| 2,063,276 A | 12/1936 | Thomas | |
| 2,798,907 A | 7/1957 | Schneider | |
| 2,903,229 A | 9/1959 | Landge | |
| 2,945,111 A | 7/1960 | McCormick | |
| 3,005,055 A | 10/1961 | Mattke | |
| 3,965,399 A | 6/1976 | Walker et al. | |
| 3,996,441 A | 12/1976 | Ohashi | |
| 4,029,915 A | 6/1977 | Ojima | |
| 4,103,252 A | 7/1978 | Bobick | |
| 4,110,749 A | 8/1978 | Janko et al. | |
| 4,115,670 A | 9/1978 | Chandler | |
| 4,121,204 A | 10/1978 | Welch et al. | |
| 4,129,747 A | 12/1978 | Pepper | |
| 4,158,216 A | 6/1979 | Bigelow | |
| 4,242,676 A | 12/1980 | Piguet et al. | |
| 4,246,452 A | 1/1981 | Chandler | |

(Continued)

FOREIGN PATENT DOCUMENTS

| | | |
|---|---|---|
| CN | 1139235 A | 1/1997 |
| CN | 1455615 | 11/2003 |

(Continued)

OTHER PUBLICATIONS

Ng et al., U.S. Office Action mailed Jul. 8, 2010, directed to U.S. Appl. No. 11/882,423; 19 pages.

(Continued)

*Primary Examiner* — Regina Liang
(74) *Attorney, Agent, or Firm* — Morrison & Foerster LLP

(57) ABSTRACT

A touch pad system is disclosed. The system includes mapping the touch pad into native sensor coordinates. The system also includes producing native values of the native sensor coordinates when events occur on the touch pad. The system further includes filtering the native values of the native sensor coordinates based on the type of events that occur on the touch pad. The system additionally includes generating a control signal based on the native values of the native sensor coordinates when a desired event occurs on the touch pad.

20 Claims, 9 Drawing Sheets

(56) References Cited

U.S. PATENT DOCUMENTS

| | | |
|---|---|---|
| 4,264,903 A | 4/1981 | Bigelow |
| 4,266,144 A | 5/1981 | Bristol |
| 4,293,734 A | 10/1981 | Peper, Jr. |
| D264,969 S | 6/1982 | McGoutry |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |

| | | |
|---|---|---|
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultiet et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B1 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimäki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B1 | 10/2006 | Rosedale |
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |

| | | | | | | |
|---|---|---|---|---|---|---|
| 7,439,963 B2 | 10/2008 | Geaghan et al. | | 2005/0052429 A1 | 3/2005 | Philipp |
| 7,466,307 B2 | 12/2008 | Trent et al. | | 2005/0068304 A1 | 3/2005 | Lewis et al. |
| 7,479,949 B2 | 1/2009 | Jobs et al. | | 2005/0083299 A1 | 4/2005 | Nagasaka |
| 7,486,323 B2 | 2/2009 | Lee et al. | | 2005/0083307 A1 | 4/2005 | Aufderheide |
| 7,502,016 B2 | 3/2009 | Trent, Jr. et al. | | 2005/0090288 A1 | 4/2005 | Stohr et al. |
| 7,503,193 B2 | 3/2009 | Schoene et al. | | 2005/0104867 A1 | 5/2005 | Westerman et al. |
| 7,593,782 B2 | 9/2009 | Jobs et al. | | 2005/0110768 A1 | 5/2005 | Marriott et al. |
| 7,645,955 B2 | 1/2010 | Huang et al. | | 2005/0129199 A1 | 6/2005 | Abe |
| 7,671,837 B2 | 3/2010 | Forsblad et al. | | 2005/0139460 A1 | 6/2005 | Hosaka |
| 7,708,051 B2 | 5/2010 | Katsumi et al. | | 2005/0140657 A1 | 6/2005 | Park et al. |
| 7,772,507 B2 | 8/2010 | Orr et al. | | 2005/0143124 A1 | 6/2005 | Kennedy et al. |
| 2001/0011991 A1 | 8/2001 | Wang et al. | | 2005/0156881 A1 | 7/2005 | Trent et al. |
| 2001/0011993 A1 | 8/2001 | Saarinen | | 2005/0162402 A1 | 7/2005 | Watanachote |
| 2001/0033270 A1 | 10/2001 | Osawa et al. | | 2005/0204309 A1 | 9/2005 | Szeto |
| 2001/0043545 A1 | 11/2001 | Aratani | | 2005/0237308 A1 | 10/2005 | Autio et al. |
| 2001/0050673 A1 | 12/2001 | Davenport | | 2006/0026521 A1 | 2/2006 | Hotelling et al. |
| 2001/0051046 A1 | 12/2001 | Watanabe et al. | | 2006/0032680 A1 | 2/2006 | Elias et al. |
| 2002/0000978 A1 | 1/2002 | Gerpheide | | 2006/0038791 A1 | 2/2006 | Mackey |
| 2002/0011993 A1 | 1/2002 | Lui et al. | | 2006/0095848 A1 | 5/2006 | Naik |
| 2002/0027547 A1 | 3/2002 | Kamijo | | 2006/0097991 A1 | 5/2006 | Hotelling et al. |
| 2002/0030665 A1 | 3/2002 | Ano | | 2006/0131156 A1 | 6/2006 | Voelckers |
| 2002/0033848 A1 | 3/2002 | Sciammarella et al. | | 2006/0143574 A1 | 6/2006 | Ito et al. |
| 2002/0039493 A1 | 4/2002 | Tanaka | | 2006/0174568 A1 | 8/2006 | Kinoshita et al. |
| 2002/0045960 A1 | 4/2002 | Phillips et al. | | 2006/0181517 A1 | 8/2006 | Zadesky et al. |
| 2002/0071550 A1 | 6/2002 | Pletikosa | | 2006/0197750 A1 | 9/2006 | Kerr et al. |
| 2002/0089545 A1 | 7/2002 | Levi Montalcini | | 2006/0232557 A1 | 10/2006 | Fallot-Burghardt |
| 2002/0103796 A1 | 8/2002 | Hartley | | 2006/0236262 A1 | 10/2006 | Bathiche et al. |
| 2002/0118131 A1 | 8/2002 | Yates et al. | | 2006/0250377 A1 | 11/2006 | Zadesky et al. |
| 2002/0118169 A1 | 8/2002 | Hinckley et al. | | 2006/0274042 A1 | 12/2006 | Krah et al. |
| 2002/0145594 A1 | 10/2002 | Derocher | | 2006/0274905 A1 | 12/2006 | Lindahl et al. |
| 2002/0154090 A1 | 10/2002 | Lin | | 2006/0279896 A1 | 12/2006 | Bruwer |
| 2002/0158844 A1 | 10/2002 | McLoone et al. | | 2006/0284836 A1 | 12/2006 | Philipp |
| 2002/0164156 A1 | 11/2002 | Bilbrey | | 2007/0013671 A1 | 1/2007 | Zadesky et al. |
| 2002/0168947 A1 | 11/2002 | Lemley | | 2007/0018970 A1 | 1/2007 | Tabasso et al. |
| 2002/0180701 A1 | 12/2002 | Hayama et al. | | 2007/0052044 A1 | 3/2007 | Forsblad et al. |
| 2002/0196239 A1 | 12/2002 | Lee | | 2007/0052691 A1 | 3/2007 | Zadesky et al. |
| 2003/0002246 A1 | 1/2003 | Kerr | | 2007/0080936 A1 | 4/2007 | Tsuk et al. |
| 2003/0025679 A1 | 2/2003 | Taylor et al. | | 2007/0080938 A1 | 4/2007 | Robbin et al. |
| 2003/0028346 A1 | 2/2003 | Sinclair et al. | | 2007/0080952 A1 | 4/2007 | Lynch et al. |
| 2003/0043121 A1 | 3/2003 | Chen | | 2007/0083822 A1 | 4/2007 | Robbin et al. |
| 2003/0043174 A1 | 3/2003 | Hinckley et al. | | 2007/0085841 A1 | 4/2007 | Tsuk et al. |
| 2003/0050092 A1 | 3/2003 | Yun | | 2007/0097086 A1 | 5/2007 | Battles et al. |
| 2003/0076301 A1 | 4/2003 | Tsuk et al. | | 2007/0120834 A1 | 5/2007 | Boillot |
| 2003/0076303 A1 | 4/2003 | Huppi | | 2007/0126696 A1 | 6/2007 | Boillot |
| 2003/0091377 A1 | 5/2003 | Hsu et al. | | 2007/0152975 A1 | 7/2007 | Ogihara |
| 2003/0095095 A1 | 5/2003 | Pihlaja | | 2007/0152977 A1 | 7/2007 | Ng et al. |
| 2003/0095096 A1 | 5/2003 | Robbin et al. | | 2007/0152983 A1 | 7/2007 | McKillop et al. |
| 2003/0098851 A1 | 5/2003 | Brink | | 2007/0155434 A1 | 7/2007 | Jobs et al. |
| 2003/0103043 A1 | 6/2003 | Mulligan et al. | | 2007/0157089 A1 | 7/2007 | Van Os et al. |
| 2003/0122792 A1 | 7/2003 | Yamamoto et al. | | 2007/0242057 A1 | 10/2007 | Zadesky et al. |
| 2003/0135292 A1 | 7/2003 | Husgafvel et al. | | 2007/0247421 A1 | 10/2007 | Orsley et al. |
| 2003/0142081 A1 | 7/2003 | Iizuka et al. | | 2007/0247443 A1 | 10/2007 | Philipp |
| 2003/0184517 A1 | 10/2003 | Senzui et al. | | 2007/0271516 A1 | 11/2007 | Carmichael |
| 2003/0197740 A1 | 10/2003 | Reponen | | 2007/0273671 A1 | 11/2007 | Zadesky et al. |
| 2003/0206202 A1 | 11/2003 | Moriya | | 2007/0276525 A1 | 11/2007 | Zadesky et al. |
| 2003/0210537 A1 | 11/2003 | Engelmann | | 2007/0279394 A1 | 12/2007 | Lampell |
| 2003/0224831 A1 | 12/2003 | Engstrom et al. | | 2007/0285404 A1 | 12/2007 | Rimon et al. |
| 2004/0027341 A1 | 2/2004 | Derocher | | 2007/0290990 A1 | 12/2007 | Robbin et al. |
| 2004/0074756 A1 | 4/2004 | Kawakami et al. | | 2007/0291016 A1 | 12/2007 | Philipp |
| 2004/0080682 A1 | 4/2004 | Dalton | | 2007/0296709 A1 | 12/2007 | GuangHai |
| 2004/0109357 A1 | 6/2004 | Cernea et al. | | 2008/0006453 A1 | 1/2008 | Hotelling et al. |
| 2004/0150619 A1 | 8/2004 | Baudisch et al. | | 2008/0006454 A1 | 1/2008 | Hotelling |
| 2004/0156192 A1 | 8/2004 | Kerr et al. | | 2008/0007533 A1 | 1/2008 | Hotelling et al. |
| 2004/0178997 A1 | 9/2004 | Gillespie et al. | | 2008/0007539 A1 | 1/2008 | Hotelling et al. |
| 2004/0200699 A1 | 10/2004 | Matsumoto et al. | | 2008/0018615 A1 | 1/2008 | Zadesky et al. |
| 2004/0215986 A1 | 10/2004 | Shakkarwar | | 2008/0018616 A1 | 1/2008 | Lampell et al. |
| 2004/0224638 A1 | 11/2004 | Fadell et al. | | 2008/0018617 A1 | 1/2008 | Ng et al. |
| 2004/0239622 A1 | 12/2004 | Proctor et al. | | 2008/0036473 A1 | 2/2008 | Jansson |
| 2004/0252109 A1 | 12/2004 | Trent, Jr. et al. | | 2008/0036734 A1 | 2/2008 | Forsblad et al. |
| 2004/0252867 A1 | 12/2004 | Lan et al. | | 2008/0060925 A1 | 3/2008 | Weber et al. |
| 2004/0253989 A1 | 12/2004 | Tupler et al. | | 2008/0069412 A1 | 3/2008 | Champagne et al. |
| 2004/0263388 A1 | 12/2004 | Krumm et al. | | 2008/0079699 A1 | 4/2008 | Mackey |
| 2004/0267874 A1 | 12/2004 | Westberg et al. | | 2008/0087476 A1 | 4/2008 | Prest |
| 2005/0012644 A1 | 1/2005 | Hurst et al. | | 2008/0088582 A1 | 4/2008 | Prest |
| 2005/0017957 A1 | 1/2005 | Yi | | 2008/0088596 A1 | 4/2008 | Prest |
| 2005/0024341 A1 | 2/2005 | Gillespie et al. | | 2008/0088597 A1 | 4/2008 | Prest |
| 2005/0030048 A1 | 2/2005 | Bolender | | 2008/0088600 A1 | 4/2008 | Prest |
| 2005/0052425 A1 | 3/2005 | Zadesky et al. | | 2008/0094352 A1 | 4/2008 | Tsuk et al. |
| 2005/0052426 A1 | 3/2005 | Hagermoser et al. | | 2008/0098330 A1 | 4/2008 | Tsuk et al. |

| | | | | | | |
|---|---|---|---|---|---|---|
| 2008/0110739 A1 | 5/2008 | Peng et al. | | GB | 2402105 A | 12/2004 |
| 2008/0111795 A1 | 5/2008 | Bollinger | | JP | 57-95722 | 6/1982 |
| 2008/0143681 A1 | 6/2008 | XiaoPing | | JP | 57-97626 | 6/1982 |
| 2008/0165158 A1 | 7/2008 | Hotelling et al. | | JP | 61-117619 | 6/1986 |
| 2008/0196945 A1 | 8/2008 | Konstas | | JP | 61-124009 | 6/1986 |
| 2008/0202824 A1 | 8/2008 | Philipp et al. | | JP | 63-20411 | 1/1988 |
| 2008/0209442 A1 | 8/2008 | Setlur et al. | | JP | 63-106826 | 5/1988 |
| 2008/0264767 A1 | 10/2008 | Chen et al. | | JP | 63-181022 | 7/1988 |
| 2008/0280651 A1 | 11/2008 | Duarte | | JP | 63-298518 | 12/1988 |
| 2008/0284742 A1 | 11/2008 | Prest | | JP | 03-57617 | 6/1991 |
| 2008/0293274 A1 | 11/2008 | Milan | | JP | 3-192418 | 8/1991 |
| 2009/0021267 A1 | 1/2009 | Golovchenko et al. | | JP | 04-32920 | 2/1992 |
| 2009/0026558 A1 | 1/2009 | Bauer et al. | | JP | 4-205408 | 7/1992 |
| 2009/0033635 A1 | 2/2009 | Wai | | JP | 5-041135 | 2/1993 |
| 2009/0036176 A1 | 2/2009 | Ure | | JP | 5-080938 | 4/1993 |
| 2009/0058687 A1 | 3/2009 | Rothkopf et al. | | JP | 5-101741 | 4/1993 |
| 2009/0058801 A1 | 3/2009 | Bull | | JP | 05-36623 | 5/1993 |
| 2009/0058802 A1 | 3/2009 | Orsley et al. | | JP | 5-189110 | 7/1993 |
| 2009/0073130 A1 | 3/2009 | Weber et al. | | JP | 5-205565 | 8/1993 |
| 2009/0078551 A1 | 3/2009 | Kang | | JP | 5-211021 | 8/1993 |
| 2009/0109181 A1 | 4/2009 | Hui et al. | | JP | 5-217464 | 8/1993 |
| 2009/0141046 A1 | 6/2009 | Rathnam et al. | | JP | 05-233141 | 9/1993 |
| 2009/0160771 A1 | 6/2009 | Hinckley et al. | | JP | 05-262276 | 10/1993 |
| 2009/0179854 A1 | 7/2009 | Weber et al. | | JP | 5-265656 | 10/1993 |
| 2009/0197059 A1 | 8/2009 | Weber et al. | | JP | 5-274956 | 10/1993 |
| 2009/0229892 A1 | 9/2009 | Fisher et al. | | JP | 05-289811 | 11/1993 |
| 2009/0273573 A1 | 11/2009 | Hotelling | | JP | 5-298955 | 11/1993 |
| 2010/0058251 A1 | 3/2010 | Rottler et al. | | JP | 5-325723 | 12/1993 |
| 2010/0060568 A1 | 3/2010 | Fisher et al. | | JP | 06-20570 | 1/1994 |
| 2010/0073319 A1 | 3/2010 | Lyon et al. | | JP | 6-084428 | 3/1994 |
| 2010/0149127 A1 | 6/2010 | Fisher et al. | | JP | 6-089636 | 3/1994 |
| 2010/0289759 A1 | 11/2010 | Fisher et al. | | JP | 6-96639 | 4/1994 |
| 2010/0313409 A1 | 12/2010 | Weber et al. | | JP | 6-111695 | 4/1994 |
| 2011/0005845 A1 | 1/2011 | Hotelling et al. | | JP | 6-139879 | 5/1994 |
| | | | | JP | 06-187078 | 7/1994 |
| FOREIGN PATENT DOCUMENTS | | | | JP | 06-208433 | 7/1994 |
| CN | 1499356 | 5/2004 | | JP | 6-267382 | 9/1994 |
| CN | 1659506 | 8/2005 | | JP | 06-283993 | 10/1994 |
| DE | 3615742 | 11/1987 | | JP | 6-333459 | 12/1994 |
| DE | 19722636 | 12/1998 | | JP | 7-107574 | 4/1995 |
| DE | 10022537 | 11/2000 | | JP | 7-41882 | 7/1995 |
| DE | 20019074 U1 | 2/2001 | | JP | 7-201249 | 8/1995 |
| DE | 10 2004 043 663 | 4/2006 | | JP | 07-201256 | 8/1995 |
| EP | 0178157 | 4/1986 | | JP | 07-253838 | 10/1995 |
| EP | 0419145 A1 | 3/1991 | | JP | 7-261899 | 10/1995 |
| EP | 0498540 A2 | 8/1992 | | JP | 7-261922 | 10/1995 |
| EP | 0521683 A2 | 1/1993 | | JP | 07-296670 | 11/1995 |
| EP | 0674288 A1 | 9/1995 | | JP | 7-319001 | 12/1995 |
| EP | 0 731 407 A1 | 9/1996 | | JP | 08-016292 | 1/1996 |
| EP | 0551778 B1 | 1/1997 | | JP | 8-115158 | 5/1996 |
| EP | 0880091 | 11/1998 | | JP | 8-203387 | 8/1996 |
| EP | 1 026 713 A1 | 8/2000 | | JP | 8-293226 | 11/1996 |
| EP | 1081922 A2 | 3/2001 | | JP | 8-298045 | 11/1996 |
| EP | 1098241 A2 | 5/2001 | | JP | 08-299541 | 11/1996 |
| EP | 1 133 057 | 9/2001 | | JP | 8-316664 | 11/1996 |
| EP | 1162826 A2 | 12/2001 | | JP | 09-044289 | 2/1997 |
| EP | 1 168 396 | 1/2002 | | JP | 09-069023 | 3/1997 |
| EP | 1205836 A2 | 5/2002 | | JP | 09-128148 | 5/1997 |
| EP | 1 244 053 | 9/2002 | | JP | 9-134248 | 5/1997 |
| EP | 1251455 A2 | 10/2002 | | JP | 9-218747 | 8/1997 |
| EP | 1263193 | 12/2002 | | JP | 9-230993 | 9/1997 |
| EP | 1347481 | 9/2003 | | JP | 9-231858 | 9/1997 |
| EP | 1376326 | 1/2004 | | JP | 09-233161 | 9/1997 |
| EP | 1 467 392 | 10/2004 | | JP | 9-251347 | 9/1997 |
| EP | 1482401 A2 | 12/2004 | | JP | 9-258895 | 10/1997 |
| EP | 1 496 467 | 1/2005 | | JP | 9-288926 | 11/1997 |
| EP | 1 517 228 | 3/2005 | | JP | 9-512979 | 12/1997 |
| EP | 1542437 A2 | 6/2005 | | JP | 10-63467 | 3/1998 |
| EP | 1 589 407 | 10/2005 | | JP | 10-74127 | 3/1998 |
| EP | 1 784 058 A2 | 5/2007 | | JP | 10-074429 | 3/1998 |
| EP | 1 841 188 | 10/2007 | | JP | 10-198507 | 7/1998 |
| EP | 1850218 | 10/2007 | | JP | 10-227878 | 8/1998 |
| EP | 1 876 711 | 1/2008 | | JP | 10-240693 | 9/1998 |
| FR | 2 686 440 A1 | 7/1993 | | JP | 10-320322 | 12/1998 |
| GB | 2015167 | 9/1979 | | JP | 10-326149 | 12/1998 |
| GB | 2072389 | 9/1981 | | JP | 11-24834 | 1/1999 |
| GB | 2315186 | 1/1998 | | JP | 11-184607 | 7/1999 |
| GB | 2333215 | 7/1999 | | JP | 11-194863 | 7/1999 |
| GB | 2391060 | 1/2004 | | JP | 11-194872 | 7/1999 |

| | | |
|---|---|---|
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 1999-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-4453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-08579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO 95/00897 A1 | 1/1995 |
| WO | WO-96/27968 | 9/1996 |
| WO | WO-98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 A1 | 5/2003 |
| WO | WO 03/044956 | 5/2003 |
| WO | WO-03/025960 | 9/2003 |
| WO | WO 03/088176 | 10/2003 |
| WO | WO 03/090008 | 10/2003 |
| WO | WO-2004/001573 | 12/2003 |
| WO | WO 2004/040606 | 5/2004 |
| WO | WO-2004/091956 | 10/2004 |
| WO | WO-2005/055620 A2 | 6/2005 |
| WO | WO 2005/076117 | 8/2005 |
| WO | WO-2005/114369 | 12/2005 |
| WO | WO-2005/124526 A2 | 12/2005 |
| WO | WO-2006/020305 | 2/2006 |
| WO | WO-2006/021211 A2 | 3/2006 |
| WO | WO 2006/037545 | 4/2006 |
| WO | WO 2006/104745 | 10/2006 |
| WO | WO-2006/135127 | 12/2006 |
| WO | WO 2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Tsuk et al., U.S. Office Action mailed Apr. 28, 2010, directed to U.S. Appl. No. 11/610,190; 29 pages.

Zadesky et al., U.S. Office Action mailed Mar. 30, 2010, directed to U.S. Appl. No. 11/592,679; 13 pages.

Hotelling et al., U.S. Office Action mailed Mar. 30, 2010, directed to U.S. Appl. No. 11/483,008; 20 pages.

Elias et al., U.S. Office Action mailed Mar. 30, 2010, directed to U.S. Appl. No. 11/203,692; 15 pages.

"Touchpad," Notebook PC Manual, ACER Information Co. Ltd., Feb. 16, 2005, pp. 11-12.

Translation of Trekstor's Defense Statement to the District Court Mannheim of May 23, 2008; 37 pages.

"Diamond Multimedia Announces Rio PMP300 Portable MP3 Music Player," located at http://news.harmony-central.com/Newp/1998/Rio-PMP300.html visited on May 5, 2008. (4 pages).

Interlink Electronics, VersaPad: Integration Guide, ©1998 (VersaPad), pp. 1-35.

Ng et al., U.S. Office Action mailed Jan. 14, 2010, directed to U.S. Appl. No. 11/394,493; 20 pages.

Ng et al., U.S. Office Action mailed Jan. 15, 2010, directed to U.S. Appl. No. 11/882,423; 22 pages.

Tsuk et al., U.S. Office Action mailed Dec. 31, 2009, directed to U.S. Appl. No. 11/610,190; 25 pages.

Zadesky et al., U.S. Office Action mailed Feb. 4, 2010, directed to U.S. Appl. No. 11/477,469; 14 pages.

Hotelling, U.S. Office Action mailed Jan. 25, 2010, directed to U.S. Appl. No. 11/482,286; 17 pages.

Lynch et al., U.S. Office Action mailed Oct. 5, 2009, directed to U.S. Appl. No. 11/499,360; 7 pages.

Lynch et al., U.S. Office Action mailed Jan. 27, 2010, directed to U.S. Appl. No. 11/499,360; 8 pages.

Letter re: Bang & Olufsen a/s by David Safran, Nixon Peabody, LLP, May 21, 2004, with BeoCom 6000 Sales Training Brochure, 7 pages.

Kobayashi et al. (1994) "Development of the Touch Switches with the Click Response," Koukuu Denshi Gihou No. 17, pp. 44-48 (published by the Japan Aviation Electronics Industry, Ltd.).

Photographs of Innovation 2000 Best of Show Award Presented at the 2000 Int'l CES Innovations Design & Engineering Showcase, Jan. 6, 2000, 1 page.

SanDisk Sansa Connect User Guide, 2007; 29 pages.

"About Quicktip®" www.logicad3d.com/docs/gt.html, downloaded Apr. 8, 2002.

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"Apple Unveils Optical Mouse and New Pro Keyboard," Press Release, Jul. 19, 2000.

"Der Klangmeister," Connect Magazine, Aug. 1998.

"Neuros MP3 Digital Audio Computer," www.neurosaudio.com, downloaded Apr. 9, 2003.

"OEM Touchpad Modules" website www.glidepoint.com/sales/modules.index.shtml, downloaded Feb. 13, 2002.

"Product Overview—ErgoCommander®," www.logicad3d.com/products/ErgoCommander.htm, downloaded Apr. 8, 2002.

"Product Overview—SpaceMouse® Classic," www.logicad3d.com/products/Classic.htm, downloaded Apr. 8, 2002.

"Synaptics Tough Pad Interfacing Guide," Second Edition, Mar. 25, 1998, Synaptics, Inc., San Jose, CA, pp. 1-90.

"System Service and Troubleshooting Manual," www.dsplib.com/intv/Master, downloaded Dec. 11, 2002.

"Alps Electric introduces the GlidePoint Wave Keyboard; combines a gentily curved design with Alps' advanced GlidePoint Technology", Business Wire, (Oct. 21, 1996).

Alps Electric Ships GlidePoint Keyboard for the Macintosh; Includes a GlidePoint Touchpad, Erase-Eaze Backspace Key and Contoured Wrist Rest, Business Wire, (Jul. 1, 1996).

"APS show guide to exhibitors", Physics Today, 49(3) (Mar. 1996).

"Design News literature plus", Design News, 51(24) (Dec. 18, 1995).

"Manufactures", Laser Focus World, Buyers Guide '96, 31(12) (Dec. 1995).

"National Design Engineering Show", Design News, 52(5) (Mar. 4, 1996).
"Preview of exhibitor booths at the Philadelphia show", Air Conditioning Heating & News, 200(2) (Jan. 13, 1997).
"Product news", Design News, 53(11) (Jun. 9, 1997).
"Product news", Design News, 53(9) (May 5, 1997).
Ahl, "Controller Update", Creative Computing vol. 9, No. 12, Dec. 1983, pp. 142-154.
Ahmad, "A Usable Real-Time 3D Hand Tracker," Proceedings of the 28th Asilomar Conference on Signals, Systems and Computers—Part 2 (of 2) vol. 2 (Oct. 1994), 5 pages.
Atari VCS/2600 Peripherals, www.classicgaming.com, downloaded Feb. 28, 2007, pp. 1-15.
Baig, E.C., "Your PC Just Might Need a Mouse," U.S. News & World Report 108(22) (Jun. 4, 1990).
Bang & Olufsen Telecom a/s, "BeoCom 6000 User Guide 2000." BeoCom 6000, Sales Training Brochure, date unknown.
Bartimo, Jim, "The Portables: Traveling Quickly", Computerworld (Nov. 14, 1983).
BeoCom 6000, Sales Training Brochure, date unknown.
Bray, "Phosphors help switch on xenon," Physics in Action, pp. 1-3, Apr. 1999.
Brink et al., "Pumped-up portables", U.S. News & World Report, 116(21) (May 30, 1994).
Brown et al., "Windows on Tablets as a Means of Achieving Virtual Input Devices", Human-Computer Interaction—Interact '90 (1990).
Buxton et al., "Issues and Techniques in Touch-Sensitive Tablet Input", Computer Graphics, 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices", Computer Graphics 22(4) (Aug. 1988).
Chinese Office Action issue Dec. 29, 2006, directed to CN Application No. 200510103886.3, 25 pages.
De Meyer, Kevin, "Crystal Optical Mouse," Feb. 14, 2002, Heatseekerz, Web Article 19.
Evans et al., "Tablet-based Valuators that Provide One, Two, or Three Degrees of Freedom", Computer Graphics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000, 6 pages.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Jesitus, John , "Broken promises?", Industry Week/IW, 246(20) (Nov. 3, 1997).
Kobayashi et al. (1997) "Dynamic Soundscape: Mapping Time to Space for Audio Browsing," *Computer Human Interaction*: 16 pages.
Kobayashi et al. "Development of the Touch Switches with the Click Response," Koukuu Denshi Gihou No. 17: pp. 44-48 (Mar. 1994) (published by the Japan Aviation Electronics Industry, Ltd.); Translation of Summary.
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Letter re: Bang & Olufsen a/s by David Safran, Nixon Peabody, LLP May 21, 2004.
Luna Technologies International, Inc., LUNA Photoluminescent Safety Products, "Photoluminescence—What is Photoluminescence?" from website at http://www.lunaplast.com/photoluminescence.com on Dec. 27, 2005.
Mims, Forrest M., III, "A Few Quick Pointers; Mouses, Touch Screens, Touch Pads, Light Pads, and The Like Can Make System Easier to Use," Computers & Electronics (22) (May 1984).
Nass, Richard, "Touchpad input device goes digital to give portable systems a desktop "mouse-like" feel", Electronic Design, 44(18) (Sep. 3, 1996).

Perenson, Melissa, "New & Improved: Touchpad Redux", PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors" Electronics Now, 64(3), (Mar. 1993).
Photographs of Innovation 2000 Best of Show Award Presented at the 2000 Int'l CES Innovations 2000 Design & Engineering Showcase, 1 page.
Soderholm, Lars G., "Sensing Systems for 'Touch and Feel,'" Design News (May 8, 1989): pp. 72-76.
Sony presents "Choice Without Compromise" at IBC '97 M2 Presswire (Jul. 24, 1997).
Spiwak, Marc, "A Great New Wireless Keyboard", Popular Electronics, 14(12) (Dec. 1997).
Spiwak, Marc, "A Pair of Unusual Controllers", Popular Electronics 14(4) (Apr. 1997).
Sylvania, "Intellvision™ Intelligent Television Master Component Service Manual," pp. 1, 2 and 8, 1979.
Tessler, Franklin, "Point Pad", Macworld 12(10) (Oct. 1995).
Tessler, Franklin, Smart Input: How to Chose from the New Generation of Innovative Input Devices, Macworld 13(5) (May 1996).
Tessler, Franklin, "Touchpads", Macworld 13(2) (Feb. 1996).
"Triax Custom Controllers due; Video Game Controllers," HFD—The Weekly Home Furnishing Newspaper 67(1) (Jan. 4, 1993).
International Search Report and Written Opinion, dated Dec. 6, 2007, directed to related International Application No. PCT/US2007/015501.
SanDisk Sansa Connect User Guide; 29 pages.
CN OA dated Aug. 14, 2009, directed to corresponding application No. CN200810000064.6; 8 pages.
Tsuk et al., U.S. Office Action mailed Aug. 7, 2009, directed to U.S. Appl. No. 11/610,181; 20 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Hotelling, U.S. Office Action mailed Sep. 1, 2009, directed to U.S. Appl. No. 11/482,286; 14 pages.
Lampell, U.S. Office Action mailed Sep. 15, 2009, directed to U.S. Appl. No. 11/530,807; 15 pages.
Boling, Douglas (1993) "Programming Microsoft Windows CE.NET;" p. 109.
Robbin, U.S. Appl. No. 60/346,237 entitled, "Method and System for List Scrolling," filed Oct. 22, 2001; 12 pages.
Zadesky et al., U.S. Appl. No. 60/359,551 entitled "Touchpad for Handheld Device," filed Feb. 25, 2002; 34 pages.
Grignon et al., U.S. Appl. No. 60/755,656, filed Dec. 30, 2005, entitled "Touch Pad with Feedback"; 109 pages.
Elias et al., U.S. Appl. No. 60/522,107, filed Aug. 16, 2004, entitled, "A Method for Increasing the Spatial Resolution of Touch Sensitive Devices"; 15 pages.
Hotelling, U.S. Appl. No. 60/658,777 titled "Multi-Functional Handheld Device," filed Mar. 4, 2005; 68 pages.
Zadesky et al., U.S. Appl. No. 60/714,609 entitled "Scrolling Input Arrangements Using Capacitive Sensors on a Flexible Membrane," filed Sep. 6, 2005; 17 pages.
Lampell et al., U.S. Appl. No. 60/810,423, filed Jun. 2, 2006, entitled "Techniques for Interactive Input to Portable Electronic Devices"; 53 pages.
Prest et al., U.S. Appl. No. 60/850,662, filed Oct. 11, 2006, entitled, "Capacitive Scroll Wheel"; 21 pages.
Bollinger, "U.S. Appl. No. 60/858,404, filed Nov. 13, 2006, entitled "Method of Capacitively Sensing Finger Position; 13 pages.
Rothkopf, U.S. Appl. No. 60/935,854 titled "Compact Media Players," filed Sep. 4, 2007; 36 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.

Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804, filed Mar. 14, 2008 entitled "Switchable Sensor Configurations"; 46 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
EP Communication Pursuant to Article 94(3) EPC dated Jul. 16, 2009, directed towards counterpart EP Application No. 04 781 727.5 ; 6 pages.
EP Communication Pursuant to Article 94(3) EPC dated Jan. 11, 2008, directed towards counterpart EP application No. 04 781 727.5.
EP Search Report mailed Apr. 12, 2007, directed towards counterpart EP application No. 04 781 727.5.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Jul. 7, 2009, directed to U.S. Appl. No. 11/610,190; 24 pages.
Robbin et al., U.S. Office Action mailed Jan. 18, 2007, directed to U.S. Appl. No. 10/259,159; 18 pages.
Robbin et al., U.S. Office Action mailed Oct. 13, 2006, directed to U.S. Appl. No. 10/259,159; 18 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.
Hotelling et al., U.S. Office Action mailed Jan. 27, 2009, directed to U.S. Appl. No. 11/882,421; 15 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Mar. 5, 2009, directed to U.S. Appl. No. 11/477,469; 12 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al., U.S. Office Action mailed Oct. 4, 2007, directed to U.S. Appl. No. 11/806,957; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
Tsuk et al., U.S. Office Action mailed Aug. 6, 2010, directed to U.S. Appl. No. 11/610,190; 30 pages.
Zadesky et al., U.S. Office Action mailed Aug. 2, 2010, directed to U.S. Appl. No. 11/882,004; 9 pages.
Hotelling, U.S. Office Action mailed Aug. 18, 2010, directed to U.S. Appl. No. 11/882,424; 16 pages.
Bull, U.S. Office Action mailed Jul. 9, 2010, directed to U.S. Appl. No. 11/849,801; 13 pages.
Tsuk et al., U.S. Office Action mailed Nov. 1, 2010, directed to U.S. Appl. No. 11/959,918; 8 pages.
Tsuk et al., U.S. Office Action mailed Oct. 26, 2010, directed to U.S. Appl. No. 11/959,942; 27 pages.
Robbin et al., U.S. Office Action mailed Oct. 29, 2010, directed to U.S. Appl. No. 11/838,845; 8 pages.
Ng et al., U.S. Office Action mailed Oct. 26, 2010, directed to U.S. Appl. No. 11/882,423; 18 pages.
Zadesky et al., U.S. Office Action mailed Oct. 4, 2010, directed to U.S. Appl. No. 11/057,050; 31 pages.
McKillop et al., U.S. Office Action mailed Sep. 16, 2010, directed to U.S. Appl. No. 11/591,752; 14 pages.

Zadesky et al., U.S. Office Action mailed Sep. 29, 2010, directed to U.S. Appl. No. 11/882,003; 13 pages.

Hotelling, U.S. Office Action mailed Oct. 1, 2010, directed to U.S. Appl. No. 11/482,286; 28 pages.

Hotelling et al., U.S. Office Action mailed Oct. 27, 2010, directed to U.S. Appl. No. 11/483,008; 23 pages.

Weber et al., U.S. Office Action mailed Oct. 13, 2010, directed to U.S. Appl. No. 12/205,795; 15 pages.

Tsuk et al., U.S. Office Action mailed Apr. 19, 2011, directed to U.S. Appl. No. 11/610,190; 25 pages.

Tsuk et al., U.S. Office Action mailed Mar. 31, 2011, directed to U.S. Appl. No. 11/959,918; 9 pages.

Robbin et al., U.S. Office Action mailed Apr. 26, 2011, directed to U.S. Appl. No. 11/838,845; 9 pages.

Zadesky et al., U.S. Office Action mailed Mar. 31, 2011, directed to U.S. Appl. No. 11/882,005; 7 pages.

Bollinger et al., U.S. Office Action mailed Mar. 21, 2011, directed to U.S. Appl. No. 11/842,724; 22 pages.

McKillop et al., U.S. Office Action mailed Mar. 24, 2011, directed to U.S. Appl. No. 11/591,752; 11 pages.

Zadesky et al., U.S. Office Action mailed Mar. 16, 2011, directed to U.S. Appl. No. 11/882,003; 12 pages.

Rathnam et al., U.S. Office Action mailed Mar. 24, 2011, directed to U.S. Appl. No. 12/205,757; 14 pages.

Ng et al., U.S. Office Action mailed Dec. 9, 2010, directed to U.S. Appl. No. 11/394,493; 13 pages.

Zadesky et al., U.S. Office Action mailed Nov. 16, 2010, directed to U.S. Appl. No. 11/477,469; 13 pages.

Lampell, U.S. Office Action mailed Dec. 3, 2010, directed to U.S. Appl. No. 11/530,807; 17 pages.

Lampell et al., U.S. Office Action mailed Dec. 22, 2010, directed to U.S. Appl. No. 11/882,427; 16 pages.

Hotelling, U.S. Office Action mailed Dec. 8, 2010, directed to U.S. Appl. No. 11/482,286; 33 pages.

Elias et al., U.S. Office Action mailed Nov. 22, 2010, directed to U.S. Appl. No. 11/203,692; 6 pages.

Zadesky et al, U.S. Office Action mailed Feb. 1, 2011, directed to U.S. Appl. No. 11/882,004; 16 pages.

Bull, U.S. Office Action mailed Feb. 4, 2011, directed to U.S. Appl. No. 11/849,801; 22 pages.

Weber et al, U.S. Office Action mailed Jan. 7, 2011, directed to U.S. Appl. No. 11/856,530; 13 pages.

Weber et al., U.S. Office Action mailed Jan. 7, 2011, directed to U.S. Appl. No. 12/205,795; 21 pages.

Weber et al., U.S. Office Action mailed Feb. 17, 2011, directed to U.S. Appl. No. 12/844,502; 11 pages.

| ACTIVE signal state | TOUCH PAD ASSEMBLY RESPONSE |
|---|---|
| LOW to HIGH | SEND BUTTON STATE AND TOUCH PAD POSITION |
| HIGH | SEND BUTTON STATE AND/OR TOUCH PAD POSITION ON CHANGE |
| LOW to HIGH | DON'T SEND MESSAGES EVEN IF STATE CHANGES |
| LOW | DON'T SEND MESSAGES EVEN IF STATE CHANGES |

FIG. 6

| EVENT | EVENT TYPE (E0) | EVENT VALUE (D0-D6) | | | | | | |
|---|---|---|---|---|---|---|---|---|
| PAD POSITION CHANGE | 1 | ABSOLUTE POSITION | | | | | | |
| BUTTON STATE CHANGE 0- TOUCHED 1- UNTOUCHED | 0 | | D6 Res. (1) | D5 Pad | D4 Prev. | D3 Next | D2 Play/ Pause | D1 Menu | D0 Select |

FIG. 7

TOUCH PAD FOR HANDHELD DEVICE

CROSS REFERENCE TO RELATED APPLICATION

The present application is a Continuation of application Ser. No. 10/722,948, titled "Touch Pad for Handheld Device," filed Nov. 25, 2003, now U.S. Pat. No. 7,495,659 which is related to application Ser. No. 10/188,182, filed Jul. 1, 2002, and which are incorporated herein by reference.

This application is related to U.S. patent application Ser. No. 10/256,716, entitled "Method and System for List Scrolling," filed on Sep. 26, 2002, and which is incorporated herein by reference.

This application is also related to U.S. Design patent application Ser. No. 29/153,169, entitled "MEDIA PLAYER," filed on Oct. 22, 2001, and which is incorporated herein by reference.

BACKGROUND OF THE INVENTION

1. Field of the Invention

The present invention relates generally to a media player having a touch pad. More particularly, the present invention relates to improved touch pads.

2. Description of the Related Art

There exist today many styles of input devices for performing operations in a consumer electronic device. The operations generally correspond to moving a cursor and making selections on a display screen. By way of example, the input devices may include buttons, switches, keyboards, mice, trackballs, touch pads, joy sticks, touch screens and the like. Each of these devices has advantages and disadvantages that are taken into account when designing the consumer electronic device. In handheld computing devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, number, etc.). In the case of hand-held personal digital assistants (PDA), the input devices tend to utilize touch-sensitive display screens. When using a touch screen, a user makes a selection on the display screen by pointing directly to objects on the screen using a stylus or finger.

In portable computing devices such as laptop computers, the input devices are commonly touch pads. With a touch pad, the movement of an input pointer (i.e., cursor) corresponds to the relative movements of the user's finger (or stylus) as the finger is moved along a surface of the touch pad. Touch pads can also make a selection on the display screen when one or more taps are detected on the surface of the touch pad. In some cases, any portion of the touch pad may be tapped, and in other cases a dedicated portion of the touch pad may be tapped. In stationary devices such as desktop computers, the input devices are generally selected from mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackballs generally include one or more buttons for making selections on the display screen.

In addition to allowing input pointer movements and selections with respect to a GUI presented on a display screen, the input devices may also allow a user to scroll across the display screen in the horizontal or vertical directions. For example, mice may include a scroll wheel that allows a user to simply roll the scroll wheel forward or backward to perform a scroll action. In addition, touch pads may provide dedicated active areas that implement scrolling when the user passes his or her finger linearly across the active area in the x and y directions. Both devices may also implement scrolling via horizontal and vertical scroll bars as part of the GUI. Using this technique, scrolling is implemented by positioning the input pointer over the desired scroll bar, selecting the desired scroll bar, and moving the scroll bar by moving the mouse or finger in the y direction (forwards and backwards) for vertical scrolling or in the x direction (left and right) for horizontal scrolling.

With regards to touch pads, mice and track balls, a Cartesian coordinate system is used to monitor the position of the finger, mouse and ball, respectively, as they are moved. The Cartesian coordinate system is generally defined as a two dimensional coordinate system (x, y) in which the coordinates of a point (e.g., position of finger, mouse or ball) are its distances from two intersecting, often perpendicular straight lines, the distance from each being measured along a straight line parallel to each other. For example, the x, y positions of the mouse, ball and finger may be monitored. The x, y positions are then used to correspondingly locate and move the input pointer on the display screen.

To elaborate further, touch pads generally include one or more sensors for detecting the proximity of the finger thereto. The sensors are generally dispersed about the touch pad with each sensor representing an x, y position. In most cases, the sensors are arranged in a grid of columns and rows. Distinct x and y position signals, which control the x, y movement of a pointer device on the display screen, are thus generated when a finger is moved across the grid of sensors within the touch pad. For brevity sake, the remaining discussion will be held to the discussion of capacitive sensing technologies. It should be noted, however, that the other technologies have similar features.

Capacitive sensing touch pads generally contain several layers of material. For example, the touch pad may include a protective shield, one or more electrode layers and a circuit board. The protective shield typically covers the electrode layer(s), and the electrode layer(s) is generally disposed on a front side of the circuit board. As is generally well known, the protective shield is the part of the touch pad that is touched by the user to implement cursor movements on a display screen. The electrode layer(s), on the other hand, is used to interpret the x, y position of the user's finger when the user's finger is resting or moving on the protective shield. The electrode layer(s) typically consists of a plurality of electrodes that are positioned in columns and rows so as to form a grid array. The columns and rows are generally based on the Cartesian coordinate system and thus the rows and columns correspond to the x and y directions.

The touch pad may also include sensing electronics for detecting signals associated with the electrodes. For example, the sensing electronics may be adapted to detect the change in capacitance at each of the electrodes as the finger passes over the grid. The sensing electronics are generally located on the backside of the circuit board. By way of example, the sensing electronics may include an application specific integrated circuit (ASIC) that is configured to measure the amount of capacitance in each of the electrodes and to compute the position of finger movement based on the capacitance in each of the electrodes. The ASIC may also be configured to report this information to the computing device.

Referring to FIG. 1, a touch pad 2 will be described in greater detail. The touch pad 2 is generally a small rectangular area that includes a protective shield 4 and a plurality of electrodes 6 disposed underneath the protective shield layer 4. For ease of discussion, a portion of the protective shield layer 4 has been removed to show the electrodes 6. Each of the electrodes 6 represents a different x, y position. In one configuration, as a finger 8 approaches the electrode grid 6, a tiny capacitance forms between the finger 8 and the electrodes 6 proximate the finger 8. The circuit board/sensing electronics measures capacitance and produces an x, y input signal 10 corresponding to the active electrodes 6. The x, y input signal 10 is sent to a host device 12 having a display screen 14. The x, y input signal 10 is used to control the movement of a cursor 16 on the display screen 14. As shown, the input pointer moves in a similar x, y direction as the detected x, y finger motion.

SUMMARY OF THE INVENTION

The invention relates, in one embodiment, to a touch pad assembly. The touch pad assembly includes a touch pad having one or more sensors that map the touch pad plane into native sensor coordinates. The touch pad assembly also includes a controller that divides the surface of the touch pad into logical device units that represent areas of the touch pad that can be actuated by a user, receives the native values of the native sensor coordinates from the sensors, adjusts the native values of the native sensor coordinates into a new value associated with the logical device units and reports the new value of the logical device units to a host device.

The invention relates, in another embodiment, to a method for a touch pad. The method includes mapping the touch pad into native sensor coordinates. The method also includes producing native values of the native sensor coordinates when events occur on the touch pad. The method further includes filtering the native values of the native sensor coordinates based on the type of events that occur on the touch pad. The method additionally includes generating a control signal based on the native values of the native sensor coordinates when a desired event occurs on the touch pad.

The invention relates, in another embodiment, to a signal processing method. The method includes receiving a current user location. The method also includes determining the difference in user location by comparing the current user location to a last user location. The method further includes only outputting the current user location when the difference in user location is larger than a threshold value. The method additionally includes converting the outputted current user location into a logical device unit. Moreover, the method includes generating a message for a host device. The message including the more logical user location. The more logical user location being used by the host device to move a control object in a specified manner.

The invention relates, in another embodiment, to a message from a touch pad assembly to a host device in a computer system that facilitates bi-directional communications between the touch pad assembly and the host device. The message includes an event field identifying whether the message is a touch pad event or a button event. The message also includes an event identifier field identifying at least one event parameter, each event parameter having an event value, the event value for a touch pad event parameter indicating an absolute position, the event value for a button event parameter indicating button status.

The invention relates, in another embodiment, to a touch pad assembly capable of transforming a user action into motion onto a display screen, the touch pad system including a touch pad having a plurality of independent and spatially distinct button zones each of which represents a different movement direction on the display screen so as to enable joystick implementations, multiple dimensional menu selection or photo image panning.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a diagram of a communication protocol, in accordance with one embodiment of the present invention.

FIG. 7 is a diagram of a message format, in accordance with one embodiment of the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
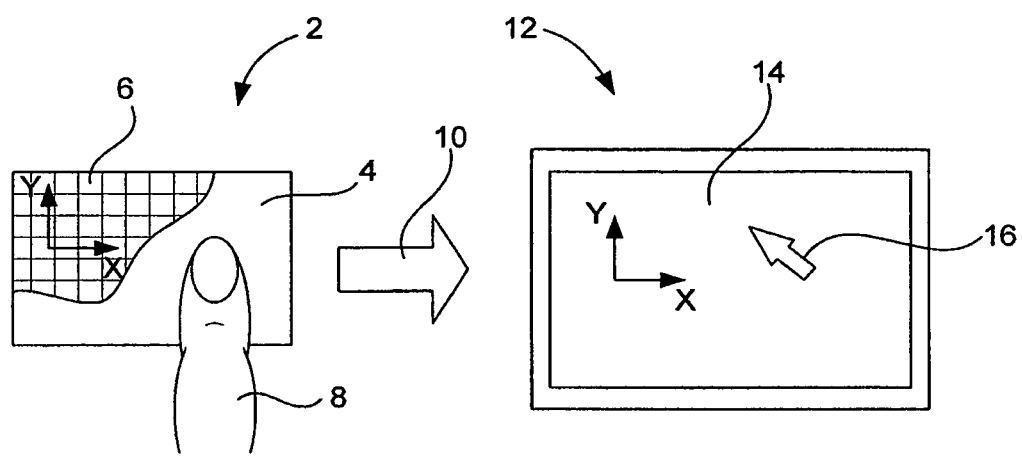
FIG. 1 is a simplified diagram of a touch pad and display.
Figure 2:
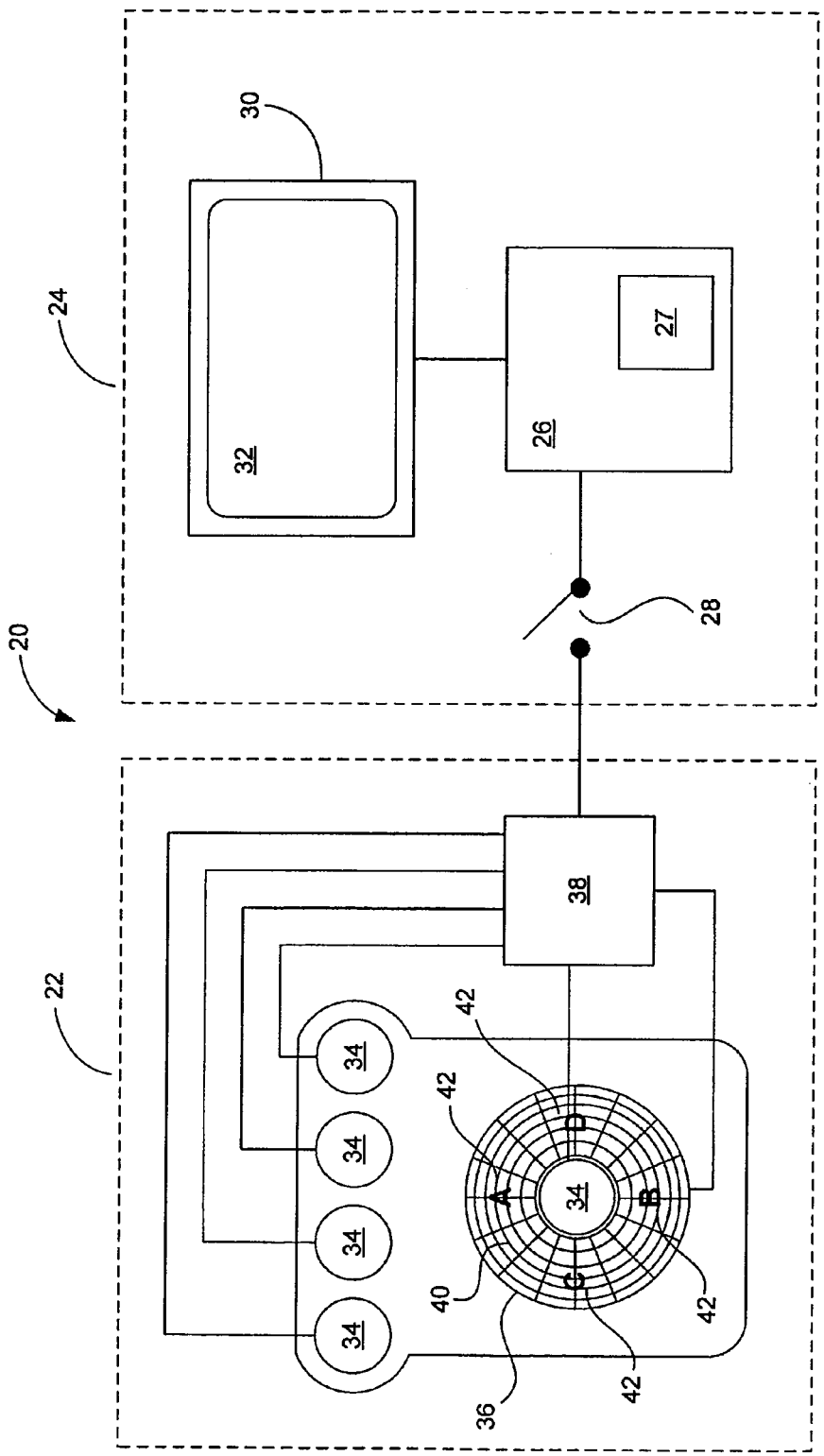
FIG. 2 is a diagram of a computing system, in accordance with one embodiment of the present invention.

FIG. 2 is a diagram of a computing system 20, in accordance with one embodiment of the present invention. The computing system 20 includes at least a user interface 22 and a host device 24. The user interface 22 is configured to provide control information for performing actions in the host device 24. By way of example, the actions may include making selections, opening a file or document, executing instructions, starting a program, viewing a menu, and/or the like. The actions may also include moving an object such as a pointer or cursor on a display screen of the host device 24. Although not shown in FIG. 2, the user interface 22 may be integrated with the host device 24 (within the same housing) or it may be a separate component (different housing).

The user interface 22 includes one or more touch buttons 34, a touch pad 36 and a controller 38. The touch buttons 34 generate button data when a user places their finger over the touch button 34. The touch pad, on the other hand, generates position data when a user places their finger (or object) over the touch pad 36. The controller 38 is configured to acquire the button data from the touch buttons 34 and the position data from the touch pad 36. The controller is also configured to output control data associated with the button data and/or position data to the host device 24. In one embodiment, the controller 38 only outputs control data associated with the touch buttons when the button status has changed. In another embodiment, the controller 38 only outputs control data associated with the touch pad when the position data has changed. The control data, which may include the raw data (button, position) or some form of thereof, may be used to implement a control function in the host device 24. By way of example, the control data may be used to move an object on the display 30 of the host device 24 or to make a selection or issue a command in the host device 24.

The touch buttons 34 and touch pad 36 generally include one or more sensors capable of producing the button and position data. The sensors of the touch buttons 34 and touch pad 36 may be distinct elements or they may be grouped together as part of a sensor arrangement, i.e., divided into sensors for the touch buttons 34 and sensors for the touch pad 36. The sensors of the touch buttons 34 are configured to produce signals associated with button status (activated, not activated). For example, the button status may indicate button activation when an object is positioned over the touch button and button deactivation at other times (or vice versa). The sensors of the touch pad 36 are configured produce signals associated with the absolute position of an object on or near the touch pad 36. In most cases, the sensors of the touch pad 36 map the touch pad plane into native or physical sensor coordinates 40. The native sensor coordinates 40 may be based on Cartesian coordinates or Polar coordinates (as shown). When Cartesian, the native sensor coordinates 40 typically correspond to x and y coordinates. When Polar (as shown), the native sensor coordinates typically correspond to radial and angular coordinates (r, θ). By way of example, the sensors may be based on resistive sensing, surface acoustic wave sensing, pressure sensing (e.g., strain gauge), optical sensing, capacitive sensing and the like.

In one embodiment, the user interface 22 includes a sensor arrangement based on capacitive sensing. The user interface 22 is therefore arranged to detect changes in capacitance as a finger moves, taps, or rests on the touch buttons 34 and touch pad 36. The capacitive touch assembly is formed from various layers including at least a set of labels, a set of electrodes (sensors) and a printed circuit board (PCB). The electrodes are positioned on the PCB, and the labels are position over the electrodes. The labels serve to protect the electrodes and provide a surface for receiving a finger thereon. The label layer also provides an insulating surface between the finger and the electrodes. As should be appreciated, the controller 38 can determine button status at each of the touch buttons 34 and position of the finger on the touch pad 36 by detecting changes in capacitance. In most cases, the controller 38 is positioned on the opposite side of the PCB. By way of example, the controller 38 may correspond to an application specific integrated circuit (ASIC), and it may operate under the control of Firmware stored on the ASIC.

Referring to the controller 38, the controller 38 is configured to monitor the sensors of the touch buttons 34 and touch pad 36 and decide what information to report to the host device 24. The decision may include filtering and/or conversion processes. The filtering process may be implemented to reduce a busy data stream so that the host device 24 is not overloaded with redundant or non-essential data. By way of example, a busy data stream may be created when multiple signals are produced at native sensor coordinates 40 that are in close proximity to one another. As should be appreciated, processing a busy data stream tends to require a lot of power, and therefore it can have a disastrous effect on portable devices such as media players that use a battery with a limited power supply. Generally speaking, the filtering process throws out redundant signals so that they do not reach the host device 24. In one implementation, the controller 38 is configured to only output a control signal when a significant change in sensor signals is detected. A significant change corresponds to those changes that are significant, as for example, when the user decides to move his/her finger to a new position rather than when the user's finger is simply resting on a spot and moving ever so slightly because of finger balance (toggling back and forth). The filter process may be implemented through Firmware as part of the application specific integrated circuit.

The conversion process, on the other hand, is implemented to adjust the raw data into other form factors before sending or reporting them to the host device 24. That is, the controller 38 may convert the raw data into other types of data. The other types of data may have similar or different units as the raw data. In the case of the touch pad 36, the controller 38 may convert the position data into other types of position data. For example, the controller 38 may convert absolute position data to relative position data. As should be appreciated, absolute position refers to the position of the finger on the touch pad measured absolutely with respect to a coordinate system while relative position refers to a change in position of the finger relative to the finger's previous position. The controller 38 may also convert multiple absolute coordinates into a single absolute coordinate, Polar coordinates into Cartesian coordinates, and/or Cartesian coordinates into Polar coordinates. The controller 38 may also convert the position data into button data. For example, the controller may generate button control signals when an object is tapped on a predetermined portion of the touch pad or other control signals when an object is moved in a predetermined manner over the touch pad (e.g., gesturing).

The conversion may also include placing the control signal in a format that the host device 24 can understand. By way of example, the controller 38 may follow a predetermined communication protocol. As is generally well known, communication protocols are a set of rules and procedures for exchanging data between two devices such as the user interface 22 and the host device 24. Communication protocols typically transmit information in data blocks or packets that contain the data to be transmitted, the data required to guide the packet to its destination, and the data that corrects errors that occur along the way. The controller may support a variety of communication protocols for communicating with the host device, including but not limited to, PS/2, Serial, ADB and the like. In one particular implementation, a Serial protocol is used.

The conversion process may include grouping at least a portion of the native coordinates 40 together to form one or more virtual actuation zones 42. For example, the controller 38 may separate the surface of the touch pad 36 into virtual actuation zones 42A-D and convert the native values of the native sensor coordinates 40 into a new value associated with the virtual actuation zones 42A-D. The new value may have similar or different units as the native value. The new value is typically stored at the controller 38 and subsequently passed to the host device 24. Generally speaking, the controller 38 outputs a control signal associated with a particular virtual actuation zone 42 when most of the signals are from native sensor coordinates 40 located within the particular virtual actuation zone 42.

The virtual actuation zones 42 generally represent a more logical range of values than the native sensor coordinates 40 themselves, i.e., the virtual actuation zones 42 represent areas of touch pad 36 that can be better actuated by a user (magnitudes larger). The ratio of native sensor coordinates 40 to virtual actuation zones 42 may be between about 1024:1 to about 1:1, and more particularly about 8:1. For example, the touch pad may include 128 virtual actuation areas based on 1024 native sensor coordinates.

The virtual actuation zones 42 may be widely varied. For example, they may represent absolute positions on the touch pad 36 that are magnitudes larger than the native sensor coordinates 40. For example, the touch pad 36 can be broken up into larger slices than would otherwise be attainable using the native sensor coordinates 40. In one implementation, the virtual actuation zones 42 are distributed on the touch pad 36 within a range of 0 to 95 angular positions. The angular position is zero at the 12 o clock position and progresses clockwise to 95 as it comes around to 12 o'clock again.

The virtual actuation zones 42 may also represent areas of the touch pad that can be actuated by a user to implement specific control functions such as button or movement functions. With regards to button functions, the virtual actuation zones 42 may correspond to button zones that act like touch buttons. With regards to movement functions, each of the virtual actuation zones 42 may correspond to different movement directions such that they act like arrow keys. For example, virtual actuation zone 42A may represent an upward movement, virtual actuation zone 42B may represent a downward movement, virtual actuation zone 42C may represent a left movement, and virtual actuation zone 42D may represent right movement. As should be appreciated, this type of touch pad configuration may enable game stick implementations, two dimensional menu selection, photo image panning and the like.

Although not shown, the controller 38 may also include a storage element. The storage element may store a touch pad program for controlling different aspects of the user interface 22. For example, the touch pad program may contain virtual actuation zone profiles that describe how the virtual actuation zones are distributed around the touch pad relative to the native sensor coordinates and what type of value to output based on the native values of the native sensor coordinates selected and the virtual actuation zone corresponding to the selected native sensor coordinates.

In one particular touch pad operation, the controller 38 receives the position data from the touch pad 36. The controller 38 then passes the data through a filtering process. The filtering process generally includes determining if the data is based on noise events or actual events. Noise events are associated with non significant events such as when a user's finger is simply resting on a spot and moving ever so slightly because of finger balance. Actual events are associated with significant events such as when a user decides to move his/her finger to a new position on the touch pad. The noise events are filtered out and the actual events are passed through the controller 38.

With actual events, the controller 38 determines if the position data should be adjusted. If not, the position data is reported to the host device 24. If so, the position data is converted into other form factors including but not limited to other position data or button data. For example, the native values of the sensor coordinates are converted into a new value associated with a selected virtual actuation zone. After the conversion, the controller 38 reports the converted data to the host device 24. By way of example, the controller 38 may pass the new value to a main system processor that executes the main application program running on the host device 24.

Referring to the host device 24, the host device 24 generally includes a control circuit 26. The control circuit 26 is configured to execute instructions and carry out operations associated with the host device 24. For example, the control circuit 26 may control the reception and manipulation of input and output data between the components of the computing system 20. The host device 24 may also include a hold switch 28 for activating or deactivating communications between the host device 24 and the user interface 22. The host device may additionally include a display 30 configured to produce visual information such as text and graphics on a display screen 32 via display commands from the control circuit 26. By way of example, the visual information may be in the form of a graphical user interface (GUI). Although not shown, the host device may additionally include one or more speakers or jacks that connect to headphones/speakers.

The control circuit may be widely varied. The control circuit may include one or more processors 27 that together with an operating system operate to execute computer code and produce and use data. The processor 27 can be a single-chip processor or can be implemented with multiple components. The computer code and data may reside within data storage that is operatively coupled to the processor. Data storage generally provides a place to hold data that is being used by the computer system 20. By way of example, the data storage may include Read-Only Memory (ROM), Random-Access Memory (RAM), hard disk drive and/or the like. Although not shown, the control circuit may also include an input/output controller that is operatively coupled to the processor. The input/output controller generally operates by exchanging data between the host device 24 and the I/O devices that desire to communicate with the host device 24 (e.g., touch pad assembly 22). The control circuit also typically includes a display controller that is operatively coupled to the processor. The display controller is configured to process display commands to produce text and graphics on the display screen 32 of the host device 24. The input/output controller and display controller may be integrated with the processor or they may be separate components.

It should be noted that the control circuit 26 may be configured to perform some of the same functions as the controller 38. For example, the control circuit 26 may perform conversion processes on the data received from the controller 38. The conversion may be performed on raw data or on already converted data.

Figure 3:
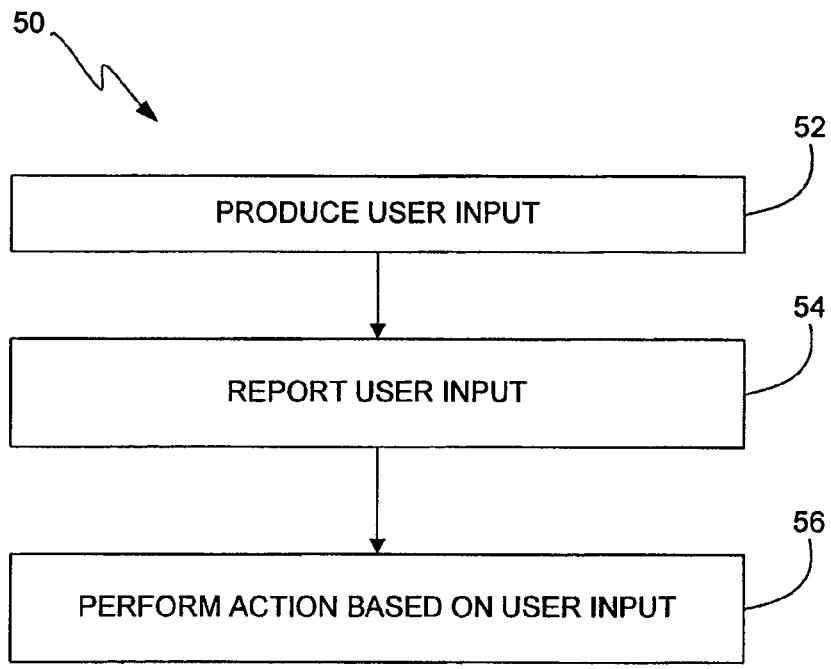
FIG. 3 is a flow diagram of signal processing, in accordance with one embodiment of the invention.

FIG. 3 is a flow diagram of signal processing 50, in accordance with one embodiment of the invention. By way of example, the signal processing 50 may be performed by the computing system shown in FIG. 2. Signal processing 50 generally begins at block 52 where a user input is produced at the user interface 22. The user input is typically based on signals generated by the sensor arrangement of the touch buttons and touchpad. The user input may include raw data. The user input may also include filtered or converted data.

Following block 52, the processing proceeds to block 54 where the user input is reported to the control circuit of the host device. The user input may contain both button and position data or it may only contain button data or position data. The user input is typically reported when a change is made and more particularly when a desired change is made at the user interface (filtered). For example, button data may be reported when the button status has changed and position data may be reported when the position of a finger has changed.

Following block 54, the processing proceeds to block 56 where an action is performed in the host device based on the user input. The actions are typically controlled by the control circuit of the host device. The actions may include making selections, opening a file or document, executing instructions, starting a program, viewing a menu, and/or the like. The actions may also include moving an object such as a pointer or cursor on a display screen of the host device 24.

Figure 4:
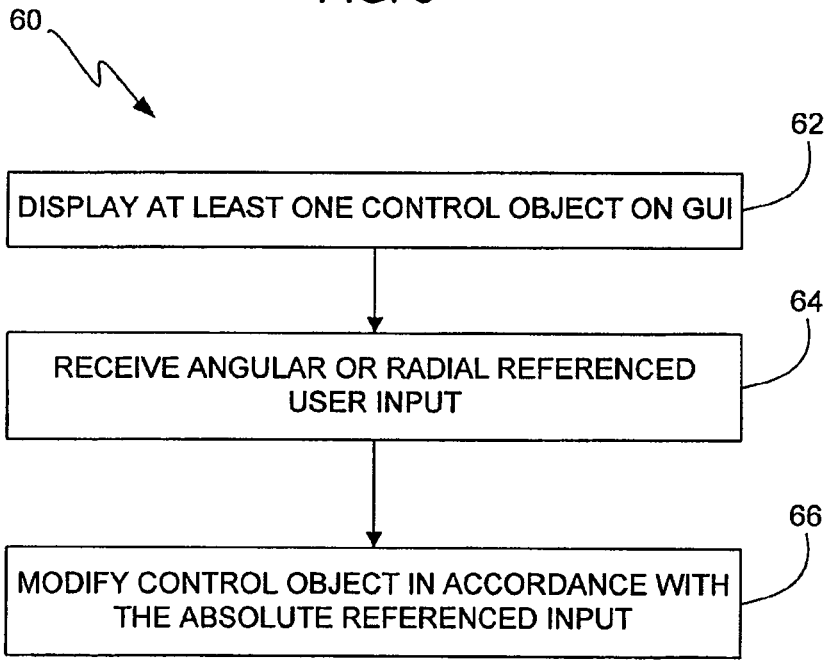
FIG. 4 is a flow diagram of touch pad processing, in accordance with one embodiment of the invention.

FIG. 4 is a flow diagram of touch pad processing 60, in accordance with one embodiment of the invention. Touch pad processing 60 generally begins at block 62 where at least one control object is displayed on a graphical user interface. The control object may be a cursor, slider bar, image or the like. By way of example, the GUI may be displayed on the display 30 of the host device 24. The GUI is typically under the control of the processor of the host device 24.

Following block 62, the processing proceeds to block 64 where an angular or radial referenced input is received. By way of example, the angular or radial referenced input may be produced by the user interface 22 and received by the processor of the host device 24. The angular or radial referenced input may be raw data formed by the sensor arrangement or converted data formed at the controller. Furthermore, the raw or converted data may be filtered so as to reduce a busy data stream.

Following block 64, touch pad processing proceeds to block 66 where the control object is modified based on the angular or radial referenced input. For example, the direction that a control object such as a football player in a football game is moving may be changed from a first direction to a second direction or a highlight bar may be moved through multiple images in a photo library. The modification is typically implemented by the processor of the host device.

Figure 5:
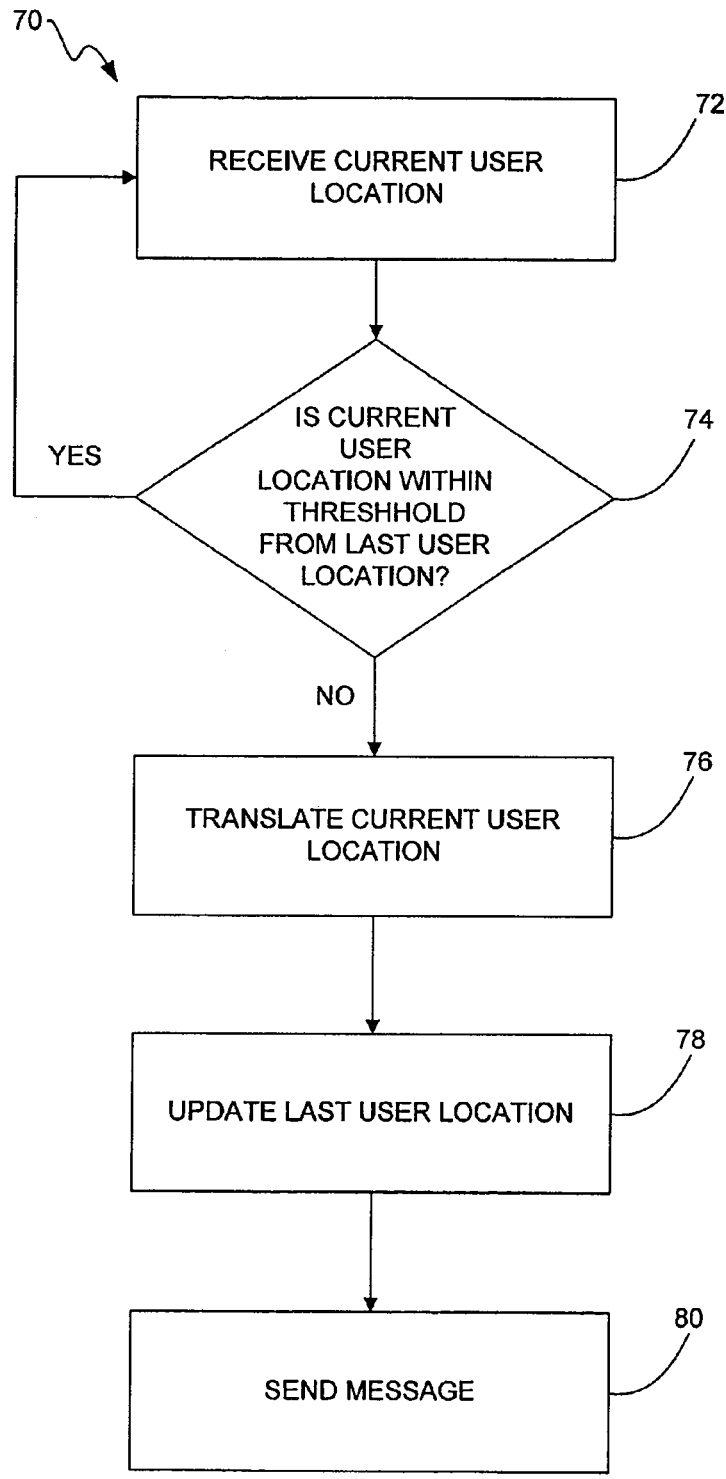
FIG. 5 is a flow diagram of a touch pad processing, in accordance with one embodiment of the invention.

FIG. 5 is a flow diagram of a touch pad processing 70, in accordance with one embodiment of the invention. By way of example, touch pad processing may be performed by the controller shown in FIG. 2. Furthermore, it may be associated with blocks 52/54 and 62 shown in FIGS. 3 and 4. Touch pad processing 70 generally begins at block 72 where a current user location is received. The current user location corresponds to the current location of the user's finger on the touch pad. For example, the controller may detect the changes in sensor levels at each of the native sensor coordinates and thereafter determine the current location of the user's finger on the touch pad based on the change in sensor levels at each of the native sensor coordinates.

Following block 72, the process flow proceeds to block 74 where a determination is made as to whether the current user location is within a threshold from the last user location, i.e., the user location that precedes the current user location. In some cases, the current user location is compared to the last user location to determine the difference in user location, i.e., how much movement occurred between the current and last readings. If the current user location is within the threshold then an undesired change has been made and the process flow proceeds back to block 72. If the current location is outside the threshold then a desired change has been made and the process flow proceeds to block 76. By way of example:

Undesired change: |currentUserLocation−lastUserLocation|<Threshold

Desired change: |currentUserLocation−lastUserLocation|≥Threshold

In one embodiment, the threshold may be defined as the number of sensor levels that need to change in order to report a change in the user finger location to the main system processor of the host device. In one particular implementation, the threshold is equal to about 3. The threshold may be determined by the following equation:

Threshold $(T) = C^*$(native sensor coordinate resolution/ logical device unit resolution), where the native sensor coordinate resolution defines the maximum number of different positions that the sensors are able to detect for a specific plane coordinate system, the logical device unit resolution defines the number of values that are communicated to the main system processor of the host device for the said specific plane coordinate system, and coefficient C defines the width border area between the clusters of native sensor coordinates that define one logical device unit.

The coefficient C is generally determined by the sensitivity needed to initiate a user event to the main system processor of the host device. It customizes the threshold value to the physical limitations of the sensor technology and the expected noise of the user finger events. Larger values tend to filter more events and reduce sensitivity. The system designer may pick the exact value of C by testing several values to strike optimal balance between sensitivity and stability of the user finger location. The coefficient C is typically a value between 0 and 0.5, and more particularly about 0.25. As should be appreciated, the threshold (T) is about 2 when the native sensor coordinate resolution is about 1024, the logical device unit resolution is about 128 and the coefficient is about 0.25.

In block 76, a new value associated with a particular logical device unit is generated based on the changed native sensor coordinates associated with the particular logical device unit. In most cases, the raw number of slices in the form of native sensor coordinates are grouped into a more logical number of slices in the form of logical device units (e.g., virtual actuation zones).

Following block 76, the process flow proceeds to block 78 where the last user location is updated. That is, the last current location is changed to the current user location. The current user location now acts as the last user location for subsequent processing.

Following block 78, the process flow proceeds to block 80 where a message is sent. In most cases, the message is sent when the difference between the current and last user location is larger than the threshold value. The message generally includes the new value associated with the selected logical device unit. By way of example, the touch pad may send a message to the main system processor of the host device. When received by the main system processor, the message may be used to make an adjustment in the host device, i.e., cause a control object to move in a specified manner.

FIG. 6 is a diagram of a communication protocol 82, in accordance with one embodiment of the present invention. By way of example, the communication protocol may be used by the user interface and host device of FIG. 2. In this particular embodiment, the user interface 22 has one dedicated input ACTIVE line that is controlled by the control circuit 26. The state of the ACTIVE line signal may be set at LOW or HIGH. The hold switch 28 may be used to change the state of the ACTIVE line signal (for example when the hold switch is in a first position or second position). As shown in FIG. 6, when the ACTIVE signal is set to HIGH, the user interface 22 sends a synch message to the control circuit 26 that describes the Button and Touch pad status (e.g., button state and touch pad position). In one embodiment, new synch messages are only sent when the Button state and/or the Touch Pad status changes. For example, when the touch pad position has changed within a desired limit. When the ACTIVE signal is set to LOW, the user interface 22 does not send a synch message to the control circuit 26. When the ACTIVE signal is toggled from LOW to HIGH, the user interface 22 sends a Button state and touch pad position message. This may be used on startup to initialize the state. When the ACTIVE signal is toggled from HIGH to LOW, the user interface 22 does not send a synch message to the control circuit 26. In one embodiment, the user interface 22 is configured to send a two data byte message if both the Buttons and touch pad positions changes since the last message was sent, and a one data byte message if only one button state or touch pad position changes.

FIG. 7 is a diagram of a message format 86, in accordance with one embodiment of the present invention. By way of example, the message format 86 may correspond to the synch message described in FIG. 6. The message format 86 may form a two data byte message or a one data byte message. Each data byte is configured as an 8 bit message. The upper Most Significant Bit (MSB) of the message is the event type (1 bit) and the lower Least Significant Bits (LSB) are the event value (7 bits).

The event value is event type specific. In FIG. 7, the event type bits are marked as E0, and the event value is marked as D0-D6. As indicated in the diagram, the event type may be a touch pad position change E1 or a button state change E0 when the button is being touched or E1 when the button is not being touched. The event values may correspond to different button events such as seeking forwards (D4), seeking backwards (D3), playing and pausing (D2), providing a menu (D1) and making selections (D0). The event values may also correspond to touch pad events such as touchpad position (D5). For example, in a touch pad that defines the logical coordinates in polar coordinates from 0-127, the event value may correspond to an absolute touch pad position in the range of 0-127 angular positions where zero is 12 o clock, 32 is 3 o clock, 64 is 6 o clock and 96 is 9 o clock, etc. going clockwise. The event values may also correspond to a reserve (D6). The reserve is an unused bit that may be used to extend the API.

Figure 8:
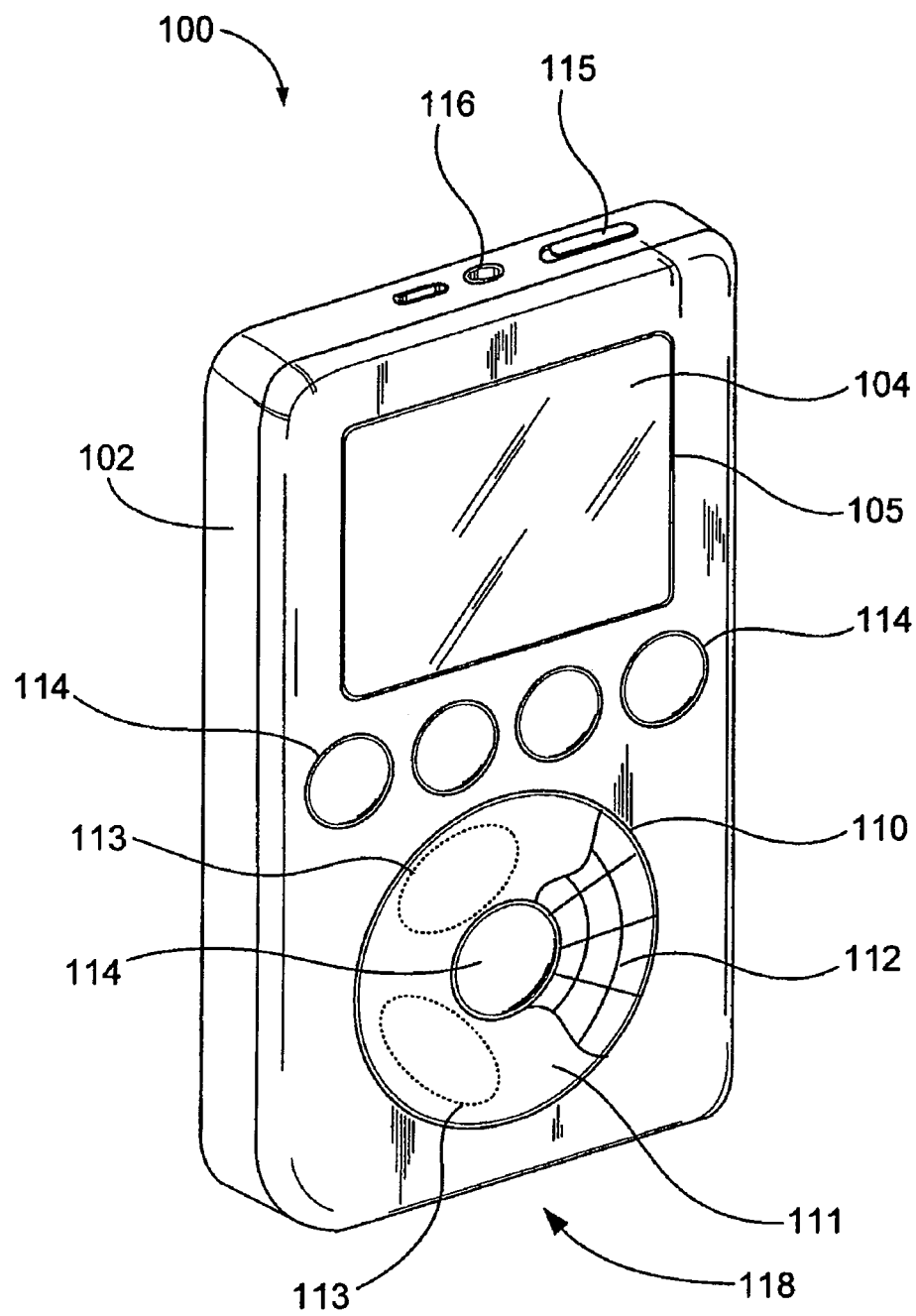
FIG. 8 is a perspective view of a media player, in accordance with one embodiment of the invention.

FIG. 8 is a perspective diagram of a media player 100, in accordance with one embodiment of the present invention. By way of example, the media player 100 may generally correspond to the host device shown in FIG. 2. The term "media player" generally refers to computing devices that are dedicated to processing media such as audio, video or other images, as for example, music players, game players, video players, video recorders, cameras, and the like. In some cases, the media players contain single functionality (e.g., a media player dedicated to playing music) and in other cases the media players contain multiple functionality (e.g., a media player that plays music, displays video, stores pictures and the like). In either case, these devices are generally portable so as to allow a user to listen to music, play games or video, record video or take pictures wherever the user travels.

In one embodiment, the media player 100 is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a laptop or notebook computer). For example, in the case of a music player, a user may use the device while working out at the gym. In case of a camera, a user may use the device while mountain climbing. In the case of a game player, the user can use the device while traveling in a car. Furthermore, the device may be operated by the users hands, no reference surface such as a desktop is needed (this is shown in greater detail in FIG. 6). In the illustrated embodiment, the media player 100 is a pocket sized hand held MP3 music player that allows a user to store a large collection of music (e.g., in some cases up to 4,000 CD-quality songs). By way of example, the MP3 music player may correspond to the iPod MP3 player manufactured by Apple Computer of Cupertino, Calif. Although used primarily for storing and playing music, the MP3 music player shown herein may also include additional functionality such as storing a calendar and phone lists, storing and playing games, storing photos and the like. In fact, in some cases, it may act as a highly transportable storage device.

As shown in FIG. 8, the media player 100 includes a housing 102 that encloses internally various electrical components (including integrated circuit chips and other circuitry) to provide computing operations for the media player 100. In addition, the housing may also define the shape or form of the media player. That is, the contour of the housing 102 may embody the outward physical appearance of the media player 100. The integrated circuit chips and other circuitry contained within the housing may include a microprocessor (e.g., CPU), memory (e.g., ROM, RAM), a power supply (e.g., battery), a circuit board, a hard drive, other memory (e.g., flash) and/or various input/output (I/O) support circuitry. The electrical components may also include components for inputting or outputting music or sound such as a microphone, amplifier and a digital signal processor (DSP). The electrical components may also include components for capturing images such as image sensors (e.g., charge coupled device (CCD) or complimentary oxide semiconductor (CMOS)) or optics (e.g., lenses, splitters, filters).

In the illustrated embodiment, the media player 100 includes a hard drive thereby giving the media player 100 massive storage capacity. For example, a 20 GB hard drive can store up to 4000 songs or about 266 hours of music. In contrast, flash-based media players on average store up to 128 MB, or about two hours, of music. The hard drive capacity may be widely varied (e.g., 5, 10, 20 MB, etc.). In addition to the hard drive, the media player 100 shown herein also includes a battery such as a rechargeable lithium polymer battery. These type of batteries are capable of offering about 10 hours of continuous playtime to the media player 100.

The media player 100 also includes a display screen 104 and related circuitry. The display screen 104 is used to display a graphical user interface as well as other information to the user (e.g., text, objects, graphics). By way of example, the display screen 104 may be a liquid crystal display (LCD). In one particular embodiment, the display screen 104 corresponds to a 160-by-128-pixel high-resolution display, with a white LED backlight to give clear visibility in daylight as well as low-light conditions. As shown, the display screen 104 is visible to a user of the media player 100 through an opening 105 in the housing 102.

The media player 100 also includes a touch pad 110. The touch pad is an intuitive interface that provides easy one-handed operation, i.e., lets a user interact with the media player 100 with one or more fingers. The touch pad 110 is configured to provide one or more control functions for controlling various applications associated with the media player 100. For example, the touch initiated control function may be used to move an object on the display screen 104 or to make selections or issue commands associated with operating the media player 100. In order to implement the touch initiated control function, the touch pad 110 may be arranged to receive input from a finger moving across the surface of the touch pad 110, from a finger holding a particular position on the touch pad and/or by a finger tapping on a particular position of the touch pad.

The touch pad 110 generally consists of a touchable outer surface 111 for receiving a finger for manipulation on the touch pad 110. Beneath the touchable outer surface 111 is a sensor arrangement 112. The sensor arrangement 112 includes one or more sensors that are configured to activate as the finger sits on, taps on or passes over them. The sensor arrangement 112 may be based on a Cartesian coordinate system, a Polar coordinate system or some other coordinate system. In the simplest case, an electrical signal is produced each time the finger is positioned over a sensing coordinate of the sensor arrangement 112. The number of signals in a given time frame may indicate location, direction, speed and acceleration of the finger on the touch pad, i.e., the more signals, the more the user moved his or her finger. In most cases, the signals are monitored by a control assembly that converts the number, combination and frequency of the signals into location, direction, speed and acceleration information and reports this information to the main system processor of the media player. This information may then be used by the media player 100 to perform the desired control function on the display screen 104.

In one embodiment, the surface of the touch pad 110 is divided into several independent and spatially distinct actuation zones 113A-D disposed around the periphery of the touch pad 110. The actuation zones generally represent a more logical range of user inputs than the sensors themselves. Generally speaking, the touch pad 110 outputs a control signal associated with a particular actuation zone 113 when most of the signals are from sensing coordinates located within the particular actuation zone 113. That is, when an object approaches a zone 113, a position signal is generated at one or more sensing coordinates. The position signals generated by the one or more sensing coordinates may be used to inform the media player 100 that the object is at a specific zone 113 on the touch pad 110.

The actuation zones may be button zones or positional zones. When button zones, a button control signal is generated when an object is placed over the button zone. The button control signal may be used to make selections, open a file, execute instructions, start a program, view a menu in the media player. When positional zones, a position control signal is generated when an object is placed over the positional zone. The position signals may be used to control the movement of an object on a display screen of the media player. The distribution of actuation zones may be controlled by touch pad translation software or firmware that converts physical or native coordinates into virtual representation in the form of actuation zones. The touch pad translation software may be run by the control assembly of the touch pad or the main system processor of the media player. In most cases, the control assembly converts the acquired signals into signals that represent the zones before sending the acquired signals to the main system processor of the media player.

The position control signals may be associated with a Cartesian coordinate system (x and y) or a Polar coordinate system (r, θ). Furthermore, the position signals may be provided in an absolute or relative mode. In absolute mode, the absolute coordinates of where it is being touched on the touch pad are used. For example x, y in the case of the Cartesian coordinate system or (r, θ) in the case of the Polar coordinate system. In relative mode, the change in position of the finger relative to the finger's previous position is used. The touch pad may be configured to operate in a Cartesian-absolute mode, a Cartesian-relative mode, a Polar-absolute mode or a Polar-relative mode. The mode may be controlled by the touch pad itself or by other components of the media player system.

In either case, a user may select which mode that they would like to operate in the media player system or the applications running on the media player system may automatically set the mode of the media player system. For example, a game application may inform the media player system to operate in an absolute mode so that the touch pad can be operated as a joystick or a list application may inform the media player system to operate in a relative mode so that the touch pad can be operated as a scroll bar.

In one embodiment, each of the zones 113 represents a different polar angle that specifies the angular position of the zone 113 in the plane of the touch pad 110. By way of example, the zones 113 may be positioned at 90 degree increments all the way around the touch pad 110 or something smaller as for example 2 degree increments all the way around the touch pad 110. In one embodiment, the touch pad 110 may convert 1024 physical positions in the form of sensor coordinates, to a more logical range of 0 to 127 in the form of positional zones. As should be appreciated, the touch pad internal accuracy (1024 positions) is much larger than the accuracy (128 positions) needed for making movements on the display screen.

The position of the touch pad 110 relative to the housing 102 may be widely varied. For example, the touch pad 110 may be placed at any external surface (e.g., top, side, front, or back) of the housing 102 that is accessible to a user during manipulation of the media player 100. In most cases, the touch sensitive surface 111 of the touch pad 110 is completely exposed to the user. In the illustrated embodiment, the touch pad 110 is located in a lower, front area of the housing 102. Furthermore, the touch pad 110 may be recessed below, level with, or extend above the surface of the housing 102. In the illustrated embodiment, the touch sensitive surface 111 of the touch pad 110 is substantially flush with the external surface of the housing 102.

The shape of the touch pad 110 may also be widely varied. For example, the touch pad 110 may be circular, rectangular, triangular, and the like. In general, the outer perimeter of the shaped touch pad defines the working boundary of the touch pad. In the illustrated embodiment, the touch pad 110 is circular. This particular shape works well with Polar coordinates. More particularly, the touch pad is annular, i.e., shaped like or forming a ring. When annular, the inner and outer perimeter of the shaped touch pad defines the working boundary of the touch pad.

In addition to above, the media player 100 may also include one or more buttons 114. The buttons 114 are configured to provide one or more dedicated control functions for making selections or issuing commands associated with operating the media player 100. By way of example, in the case of an MP3 music player, the button functions may be associated with opening a menu, playing a song, fast forwarding a song, seeking through a menu and the like. The buttons 114 may be mechanical clicking buttons and/or they may be touch buttons. In the illustrated embodiment, the buttons are touch buttons that receive input from a finger positioned over the touch button. Like the touch pad 110, the touch buttons 114 generally consist of a touchable outer surface for receiving a finger and a sensor arrangement disposed below the touchable outer surface. By way of example, the touch buttons and touch pad may generally correspond to the touch buttons and touch pad shown in FIG. 2.

The position of the touch buttons 114 relative to the touch pad 110 may be widely varied. For example, they may be adjacent one another or spaced apart. In the illustrated embodiment, the buttons 114 are placed above the touch pad 110 in a linear manner as well as in the center of the annular touch pad 110. By way of example, the plurality of buttons 114 may consist of a menu button, play/stop button, forward seek button, a reverse seek button, and the like.

Moreover, the media player 100 may also include a hold switch 115. The hold switch 115 is configured to activate or deactivate the touch pad and/or buttons. This is generally done to prevent unwanted commands by the touch pad and/or buttons, as for example, when the media player is stored inside a user's pocket. When deactivated, signals from the buttons and/or touch pad are not sent or are disregarded by the media player. When activated, signals from the buttons and/or touch pad are sent and therefore received and processed by the media player.

Moreover, the media player 100 may also include one or more headphone jacks 116 and one or more data ports 118. The headphone jack 116 is capable of receiving a headphone connector associated with headphones configured for listening to sound being outputted by the media device 100. The data port 118, on the other hand, is capable of receiving a data connector/cable assembly configured for transmitting and receiving data to and from a host device such as a general purpose computer (e.g., desktop computer, portable computer). By way of example, the data port 118 may be used to upload or down load audio, video and other images to and from the media device 100. For example, the data port may be used to download songs and play lists, audio books, ebooks, photos, and the like into the storage mechanism of the media player.

The data port 118 may be widely varied. For example, the data port may be a PS/2 port, a serial port, a parallel port, a USB port, a Firewire port and/or the like. In some cases, the data port 118 may be a radio frequency (RF) link or optical infrared (IR) link to eliminate the need for a cable. Although not shown in FIG. 2, the media player 100 may also include a power port that receives a power connector/cable assembly configured for delivering powering to the media player 100. In some cases, the data port 118 may serve as both a data and power port. In the illustrated embodiment, the data port 118 is a Firewire port having both data and power capabilities.

Although only one data port is described, it should be noted that this is not a limitation and that multiple data ports may be incorporated into the media player. In a similar vein, the data port may include multiple data functionality, i.e., integrating the functionality of multiple data ports into a single data port. Furthermore, it should be noted that the position of the hold switch, headphone jack and data port on the housing may be widely varied. That is, they are not limited to the positions shown in FIG. 2. They may be positioned almost anywhere on the housing (e.g., front, back, sides, top, bottom). For example, the data port may be positioned on the bottom surface of the housing rather than the top surface as shown.

Figure 9:
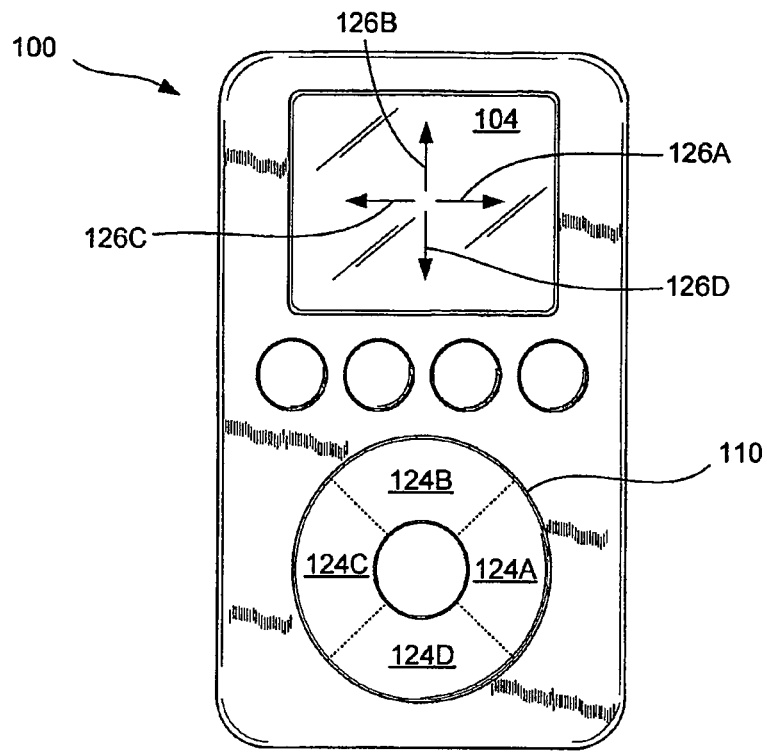
FIG. 9 is a front view of a media player, in accordance with one embodiment of the present invention.

Referring to FIG. 9, the touch pad 110 will be described in greater detail. In this particular embodiment, the touch pad is operating in an absolute mode. That is, the touch pad reports the absolute coordinates of where it is being touched. As shown, the touch pad 110 includes one or more zones 124. The zones 124 represent regions of the touch pad 110 that may be actuated by a user to implement one or more actions or movements on the display screen 104.

The distribution of the zones 124 may be widely varied. For example, the zones 124 may be positioned almost anywhere on the touch pad 110. The position of the zones 124 may depend on the coordinate system of the touch pad 110. For example, when using polar coordinates, the zones 124 may have one or more radial and/or angular positions. In the illustrated embodiment, the zones 124 are positioned in multiple angular positions of the Polar coordinate system. Further, the zones 124 may be formed from almost any shape whether simple (e.g., squares, circles, ovals, triangles, rectangles, polygons, and the like) or complex (e.g., random shapes). The shape of multiple button zones 124 may have identical shapes or they may have different shapes. In addition, the size of the zones 124 may vary according to the specific needs of each device. In some cases, the size of the zones 124 corresponds to a size that allows them to be easily manipulated by a user (e.g., the size of a finger tip or larger). In other cases, the size of the zones 124 are small so as to improve resolution of the touch pad 110. Moreover, any number of zones 124 may be used. In the illustrated embodiment, four zones 124A-D are shown. It should be noted, however, that this is not a limitation and that the number varies according to the specific needs of each touch pad. For example, FIG. 5 shows the media player 100 with 16 button zones 124A-P.

The number of zones 124 generally depends on the number of sensor coordinates located within the touch pad 110 and the desired resolution of the touch pad 110. The sensors are configured to sense user actions on the zones 124 and to send signals corresponding to the user action to the electronic system. By way of example, the sensors may be capacitance sensors that sense capacitance when a finger is in close proximity. The arrangement of the sensors typically varies according to the specific needs of each device. In one particular embodiment, the touch pad 110 includes 1024 sensor coordinates that work together to form 128 zones.

Figure 10:
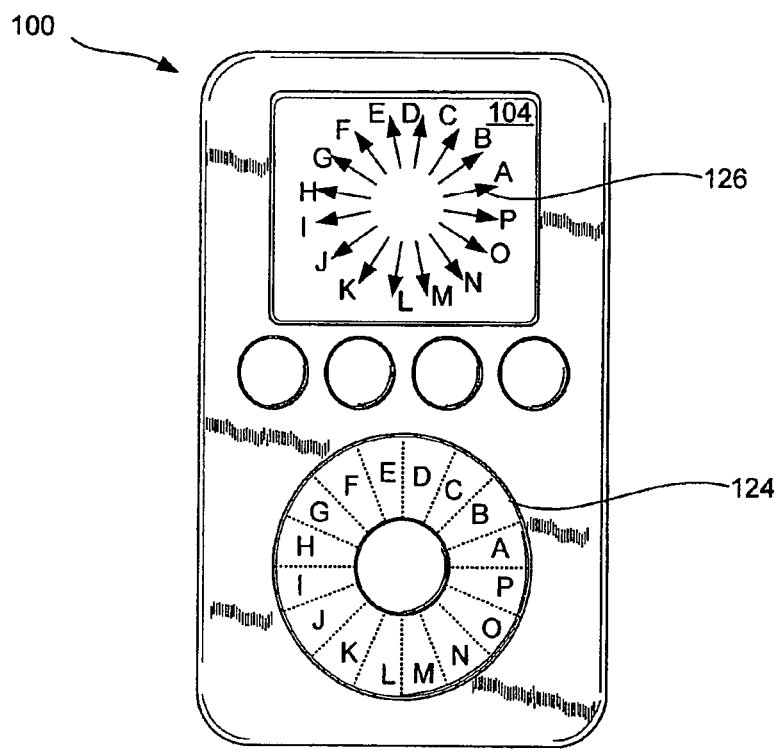
FIG. 10 is a front view of a media player, in accordance with one embodiment of the present invention.

Referring to FIGS. 9 and 10, the zones 124 when actuated are used to produce on screen movements 126. The control signal for the on screen movements may be initiated by the touch pad electronics or by the main system processor of the media player. By tapping or touching the zone, an object can be moved on the display. For example, each zone 124 may be configured to represent a particular movement on the display screen 104. In the illustrated embodiments, each of the zones 124 represents a particular direction of movement. The directions may be widely varied, however, in the illustrated embodiment, the directions generally correspond to angular directions (e.g., similar to the arrow keys on the keyboard).

Referring to FIG. 9, for example, the touch pad 110 is divided into several independent and spatially distinct zones 124A-D, each of which corresponds to a particular movement direction 126A-D (as shown by arrows), respectively. When zone 124A is actuated, on screen movements 126A (to the right) are implemented. When zone 124B is actuated, on screen movements 126B (upwards) are implemented. When zone 124C is actuated, on screen movements 126C (to the left) are implemented. When zone 124D is actuated, on screen movements 126D (down wards) are implemented. As should be appreciated, these embodiments are well suited for joystick implementations, two dimensional menu selection, photo image panning and the like.

Figures 11A, 11B:
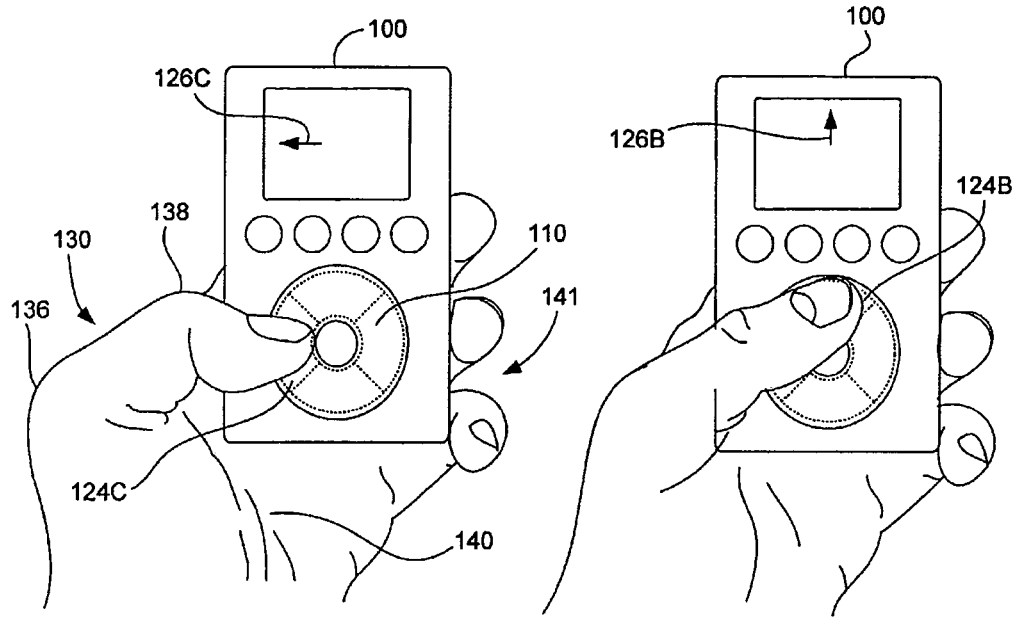
FIGS. 11A-11D are top views of a media player in use, in accordance with one embodiment of the present invention.
Figures 11C, 11D:
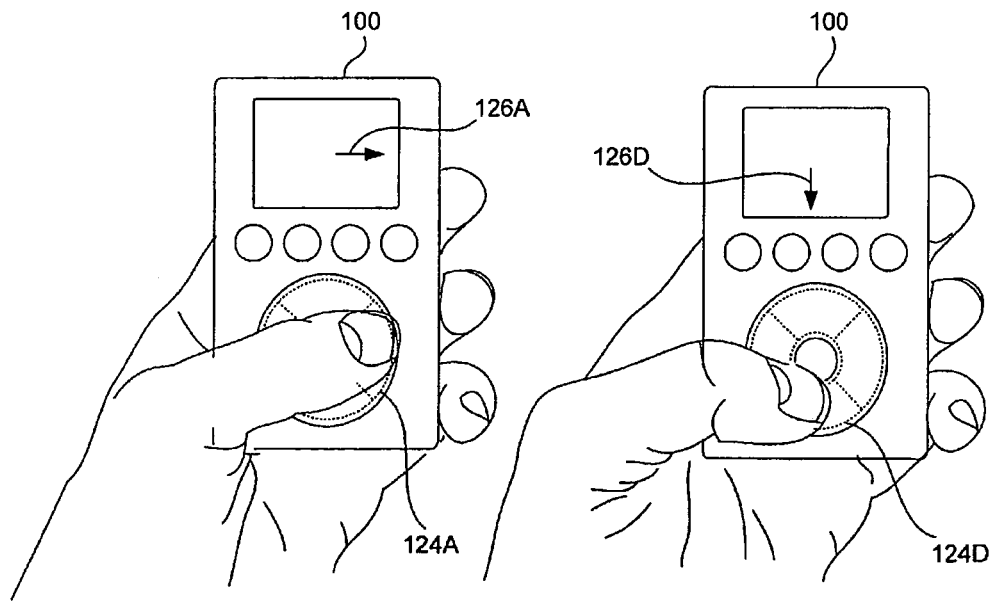

FIGS. 11A-11D show the media player 100 of FIG. 8 being used by a user 130, in accordance with one embodiment of the invention. In this embodiment, the media player 100 is being addressed for one handed operation in which the media player 100 is held in the user's hand 136 while the buttons and touch pad 110 are manipulated by the thumb 138 of the same hand 136. By way of example, the palm 140 and rightmost fingers 141 (or leftmost fingers if left handed) of the hand 136 are used to grip the sides of the media player 100 while the thumb 138 is used to actuate the touch pad 110. As shown, the entire top surface of the touch pad 110 is accessible to the user's thumb 138. Referring to FIG. 11A, on screen movements 126A to the right are implemented when the thumb 138 is placed (or tapped) on button zone 124A. Referring to FIG. 11B, on screen movements 126B upwards are implemented when the thumb 138 is placed on button zone 124B. Referring to FIG. 11C, on screen movements 126C to the left are implemented when the thumb 138 is placed on button zone 124C. Referring to FIG. 11D, on screen movements 126D downwards are implemented when the thumb 138 is placed on button zone 124D.

It should be noted that the configuration shown in FIGS. 11A-D is not a limitation and that the media player may be held a variety of ways. For example, in an alternate embodiment, the media device may comfortably held by one hand while being comfortably addressed by the other hand. This configuration generally allows the user to easily actuate the touch pad with one or more fingers. For example, the thumb and rightmost fingers (or leftmost fingers if left handed) of the first hand are used to grip the sides of the media player while a finger of the opposite hand is used to actuate the touch pad. The entire top surface of the touch pad is accessible to the user's finger.

Figure 12:
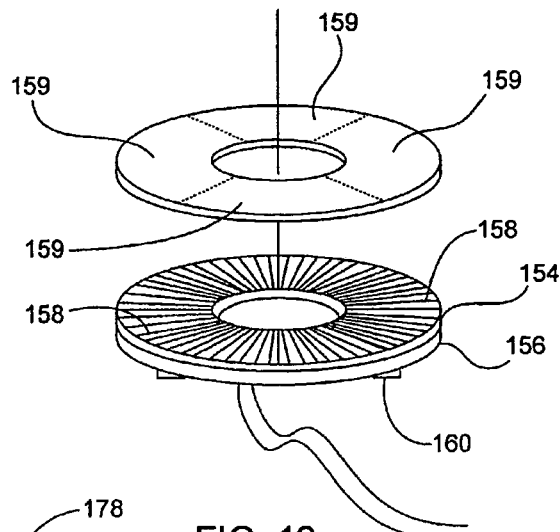
FIG. 12 is a partially broken away perspective view of an annular capacitive touch pad, in accordance with one embodiment of the present invention.

FIG. 12 is a partially broken away perspective view of an annular capacitive touch pad 150, in accordance with one embodiment of the present invention. The annular capacitive touch pad 150 is arranged to detect changes in capacitance as the user moves, taps, rests an object such as a finger on the touch pad 150. The annular capacitive touch pad 150 is formed from various layers including at least a label layer 152, an electrode layer 154 and a circuit board 156. The label layer 152 is disposed over the electrode layer 154 and the electrode layer 154 is disposed over the circuit board 156. At least the label 152 and electrode layer 154 are annular such that they are defined by concentric circles, i.e., they have an inner perimeter and an outer perimeter. The circuit board 156 is generally a circular piece having an outer perimeter that coincides with the outer perimeter of the label 152 and electrode layer 154. It should be noted, however, that in some cases the circuit board 156 may be annular or the label 152 and electrode layer 154 may be circular.

The label layer 152 serves to protect the underlayers and to provide a surface for allowing a finger to slide thereon. The surface is generally smooth so that the finger does not stick to it when moved. The label layer 152 also provides an insulating layer between the finger and the electrode layer 154. The electrode layer 154 includes a plurality of spatially distinct electrodes 158 that have positions based on the polar coordinate system. For instance, the electrodes 158 are positioned angularly and/or radically on the circuit board 156 such that each of the electrodes 158 defines a distinct angular and/or radial position thereon. Any suitable number of electrodes 158 may be used. In most cases, it would be desirable to increase the number of electrodes 158 so as to provide higher resolution, i.e., more information can be used for things such as acceleration. In the illustrated embodiment, the electrode layer 154 is broken up into a plurality of angularly sliced electrodes 158. The angularly sliced electrodes 158 may be grouped together to form one or more distinct button zones 159. In one implementation, the electrode layer 154 includes about 1024 angularly sliced electrodes that work together to form 128 angularly sliced button zones 159.

When configured together, the touch pad 150 provides a touch sensitive surface that works according to the principals of capacitance. As should be appreciated, whenever two electrically conductive members come close to one another without actually touching, their electric fields interact to form capacitance. In this configuration, the first electrically conductive member is one or more of the electrodes 158 and the second electrically conductive member is the finger of the user. Accordingly, as the finger approaches the touch pad 150, a tiny capacitance forms between the finger and the electrodes 158 in close proximity to the finger. The capacitance in each of the electrodes 158 is measured by control circuitry 160 located on the backside of the circuit board 156. By detecting changes in capacitance at each of the electrodes 158, the control circuitry 160 can determine the angular and/or radial location, direction, speed and acceleration of the finger as it is moved across the touch pad 150. The control circuitry 160 can also report this information in a form that can be used by a computing device such as a media player. By way of example, the control circuitry may include an ASIC (application specific integrated circuit).

Figures 13, 14:
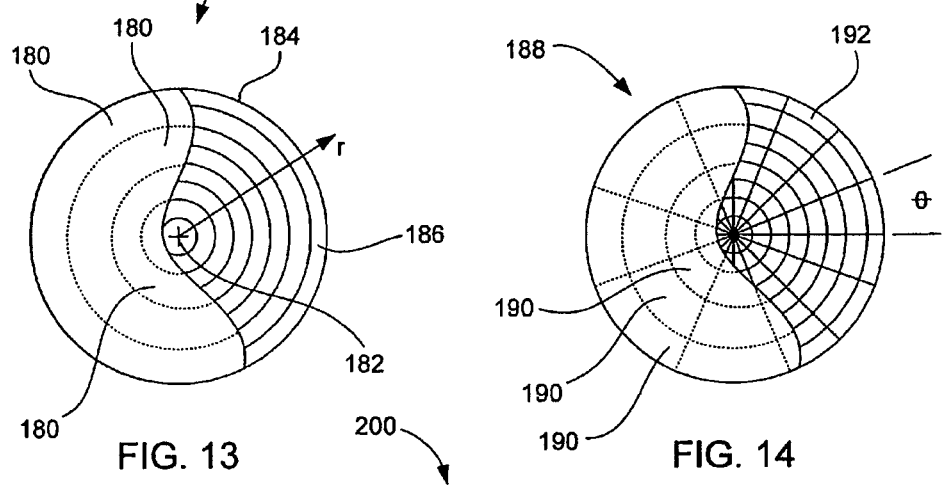
FIG. 13 is a top view of a sensor arrangement of a touch pad, in accordance with another embodiment of the present invention.
FIG. 14 is a top view of a sensor arrangement of a touch pad, in accordance with another embodiment of the present invention.

Referring to FIG. 13, a radial touch pad 178 (rather than an angular touch pad as shown in FIG. 12) will be discussed in accordance with one embodiment. The touch pad 178 may be divided into several independent and spatially distinct button zones 180 that are positioned radically from the center 182 of the touch pad 178 to the perimeter 184 of the touch pad 178. Any number of radial zones may be used. In one embodiment, each of the radial zones 180 represents a radial position in the plane of the touch pad 178. By way of example, the zones 180 may be spaced at 5 mm increments. Like above, each of the button zones 180 has one or more electrodes 186 disposed therein for detecting the presence of an object such as a finger. In the illustrated embodiment, a plurality of radial electrodes 186 are combined to form each of the button zones 180.

Referring to FIG. 14, a combination angular/radial touch pad 188 will be discussed in accordance with one embodiment. The touch pad 188 may be divided into several independent and spatially distinct button zones 190 that are positioned both angularly and radically about the periphery of the touch pad 188 and from the center of the touch pad 188 to the perimeter of the touch pad 138. Any number of combination zones may be used. In one embodiment, each of the combination button zones 190 represents both an angular and radial position in the plane of the touch pad 188. By way of example, the zones may be positioned at both 2 degrees and 5 mm increments. Like above, each of the combination zones 190 has one or more electrodes 192 disposed therein for detecting the presence of an object such as a finger. In the illustrated embodiment, a plurality of angular/radial electrodes 192 are combined to form each of the button zones 190.

Figure 15:
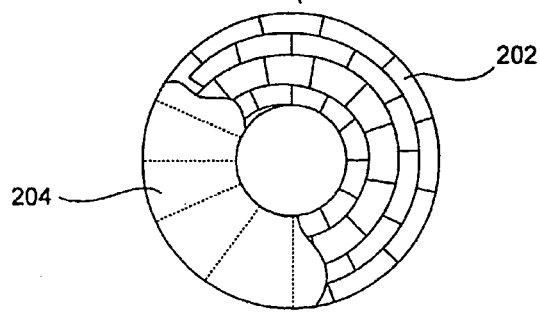
FIG. 15 is a top view of a sensor arrangement of a touch pad, in accordance with another embodiment of the present invention.

Furthermore, in order to provide higher resolution, a more complex arrangement of angular/radial electrodes may be used. For example, as shown in FIG. 15, the touch pad 200 may include angular and radial electrodes 202 that are broken up such that consecutive zones do not coincide exactly. In this embodiment, the touch pad 200 has an annular shape and the electrodes 202 follow a spiral path around the touch pad 200 from the center to the outer perimeter of the touch pad 200. The electrodes 202 may be grouped together to form one or more distinct button zones 204.

It should be noted that although the touch pads herein are all shown as circular that they may take on other forms such as other curvilinear shapes (e.g., oval, annular and the like), rectilinear shapes (e.g., hexagon, pentagon, octagon, rectangle, square, and the like) or a combination of curvilinear and rectilinear (e.g., dome).

The various aspects of the inventions described above can be used alone or in various combinations. The invention is preferably implemented by a combination of hardware and software, but can also be implemented in hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over a network coupled computer systems so that the computer readable code is stored and executed in a distributed fashion.

As mentioned above, the touch pad assembly may communicate with the host device via a serial interface. An example of a serial interface will now be described. The serial interface consists of at least four signals including a clock, ATN, DATA-IN, and DATA_OUT. The clock and DATA_OUT are driven by the touch pad assembly. The ATN and DATA_IN are driven by the host device. In most cases, packet transfers are initiated by the touch pad assembly, clocked by the touch pad assembly and done at a time convenient to the touch pad assembly. The host device relies on the touch pad assembly to initiate transfers. The touch pad assembly transfers a packet when it detects a change in button status or touch pad position or if it detects an ATN signal from the host. If the host wishes to send data to the touch pad assembly it asserts the ATN signal and keeps it asserted until after the packet it wants to send has been transferred. The touch pad assembly monitors the ATN signal and initiates a transfer if it sees it asserted.

There are typically several defined packets types that the touch pad assembly can transmit. In this example, there are at least two kinds of packets: unsolicited packets and packets sent as a response to an ATN signal. The touch pad assembly sends unsolicited packets unless specifically asked by the host to send another type. In the case of unsolicited packets, the unsolicited packets are sent periodically whenever it detects a change in button status or touch pad position. In the case of solicited packets, the touch pad assembly typically only sends one for each request by the host and then reverts back to unsolicited packets. Unsolicited packets generally have a delay between them while response packets may be sent at any time in response to the ATN signal.

While this invention has been described in terms of several preferred embodiments, there are alterations, permutations, and equivalents, which fall within the scope of this invention. For example, although the invention has been described in terms of an MP3 music player, it should be appreciated that certain features of the invention may also be applied to other types of media players such as video recorders, cameras, and the like. Furthermore, the MP3 music player described herein is not limited to the MP3 music format. Other audio formats such as MP3 VBR (variable bit rate), AIFF and WAV formats may be used. Moreover, certain aspects of the invention are not limited to handheld devices. For example, the touch pad may also be used in other computing devices such as a portable computer, personal digital assistants (PDA), cellular phones, and the like. The touch pad may also be used a stand alone input device that connects to a desktop or portable computer.

It should also be noted that there are many alternative ways of implementing the methods and apparatuses of the present invention. For example, although the touch pad has been described in terms of being actuated by a finger, it should be noted that other objects may be used to actuate it in some cases. For example, a stylus or other object may be used in some configurations of the touch pad. It is therefore intended that the following appended claims be interpreted as including all such alterations, permutations, and equivalents as fall within the true spirit and scope of the present invention.

What is claimed is:

1. A method comprising:
   identifying a current object location relative to a touch surface,
   determining an amount of movement of an object relative to the touch surface by calculating a difference between the current object location and a prior object location,
   converting the current object location into a logical device unit when the calculated amount of movement is greater than or equal to a threshold value, and
   filtering the calculated amount of movement when the calculated amount of movement is less than the threshold value so that the current object location is unaffected by the calculated amount of movement.

2. The method of claim 1, wherein the touch surface is circular.

3. The method of claim 2, wherein the touch surface is divided into a plurality of logical device units distributed around the touch surface in a clock-like manner.

4. The method of claim 1, wherein the logical device unit corresponds to a button function.

5. The method of claim 1, wherein the logical device unit corresponds to a movement direction on a display screen.

6. The method of claim 1, comprising implementing one or more functions on a media player based on the logical device unit.

7. The method of claim 1, wherein the threshold is determined by the following equation:

$$\text{threshold }(T)=C*(\text{native sensor resolution of the touch surface/logical device resolution of the touch surface}),$$

wherein the native sensor resolution represents the maximum number of different object locations detectable by sensors associated with the touch surface, the logical device resolution represents the number of logical device units associated with the touch surface, and C represents the width border area between clusters of sensors associated with the touch surface that define one logical device unit.

8. The method of claim 7, wherein C has a value between 0 and 0.5.

9. The method of claim 1, comprising storing the current object location for subsequent processing, the current user object location acting as the last object location in subsequent processing.

10. The method of claim 1, comprising generating a message for a host device, the message including the logical device unit, the logical device unit being used by the host device to move a control object in a specified manner.

11. A touch pad assembly, comprising:
    a touch pad comprising one or more sensors configured to detect a current location and a prior location, and
    a controller configured to (i) determine an amount of movement of an object relative to the touch pad by calculating a difference between the current location and the prior location, (ii) output the current location to a host device when the calculated amount of movement is greater than or equal to a threshold value, and (iii) filter the calculated amount of movement when the calculated amount of movement is less than the threshold value so that the current object location is unaffected by the calculated amount of movement.

12. The touch pad assembly of claim 11, wherein the controller is configured to output the current location to a host device by converting the current object location into a logical device unit and outputting the logical device unit to the host device.

13. The touch pad assembly of claim 12, wherein the touch pad is divided into a plurality of logical device units distributed around the touch pad in a clock-like manner.

14. The touch pad assembly of claim 13, wherein the touch pad is circular.

15. The touch pad assembly of claim 12, wherein the logical device unit corresponds to a movement direction on a display screen.

16. A method comprising:
mapping a touch pad into native sensor coordinates,
producing a native value associated with a native sensor coordinate when at least one of several different types of events occur on the touch pad,
filtering the native value based on the type of event,
generating a control signal based on the native value when a desired event occurs on the touch pad,
wherein the step of filtering comprises determining whether the native value is associated with a noise event or an actual event, filtering a noise event and passing an actual event to a host device, thereby reducing or preventing noise events from reaching the host device.

17. The method as recited in claim 16, wherein the control signal includes the native value if it is determined that the event is an actual event.

18. The method as recited in claim 16, comprising:
adjusting the native value into a new value if it is determined that the event is an actual event, and
including the new value in the control signal.

19. The method as recited in claim 18, wherein the new value and the native value are described using identical units.

20. The method as recited in claim 18, wherein the new value and the native value are described using different units.

* * * * *

UNITED STATES PATENT AND TRADEMARK OFFICE
CERTIFICATE OF CORRECTION

PATENT NO.         : 8,552,990 B2                           Page 1 of 1
APPLICATION NO.    : 11/882422
DATED              : October 8, 2013
INVENTOR(S)        : Greg Marriott et al.

It is certified that error appears in the above-identified patent and that said Letters Patent is hereby corrected as shown below:

On Title Page 8, Item (56) under References Cited, Other Publications:

Delete "Hotelling et al., U.S. Office Action mailed Jan. 27, 2009, directed to U.S. Appl. No. 11/882,421; 15 pages." and replace with --Forsblad et al., U.S. Office Action mailed Jan. 27, 2009, directed to U.S. Appl. No. 11/882,421; 15 pages.--

Signed and Sealed this
Twenty-fifth Day of February, 2014

Michelle K. Lee
*Deputy Director of the United States Patent and Trademark Office*